US012005889B2

(12) United States Patent
Horigome et al.

(10) Patent No.: US 12,005,889 B2
(45) Date of Patent: Jun. 11, 2024

(54) ARITHMETIC OPERATION DEVICE FOR VEHICLE

(71) Applicant: Mazda Motor Corporation, Hiroshima (JP)

(72) Inventors: Daisuke Horigome, Hiroshima (JP); Shinsuke Sakashita, Hiroshima (JP); Masato Ishibashi, Hiroshima (JP); Eiichi Hojin, Hiroshima (JP); Akihiro Mitani, Hiroshima (JP); Kiyoyuki Tsuchiyama, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 399 days.

(21) Appl. No.: 17/467,450

(22) Filed: Sep. 7, 2021

(65) Prior Publication Data

US 2021/0394749 A1 Dec. 23, 2021

Related U.S. Application Data

(63) Continuation of application No. PCT/JP2020/008861, filed on Mar. 3, 2020.

(30) Foreign Application Priority Data

Mar. 8, 2019 (JP) .................. 2019-043101
Mar. 8, 2019 (JP) .................. 2019-043104

(51) Int. Cl.
*B60W 30/09* (2012.01)
*B60W 50/00* (2006.01)
(52) U.S. Cl.
CPC ........ *B60W 30/09* (2013.01); *B60W 50/0098* (2013.01); *B60W 2050/0028* (2013.01); *B60W 2554/20* (2020.02)

(58) Field of Classification Search
CPC ............ B60W 30/09; B60W 50/0098; B60W 2050/0028; B60W 2554/20;
(Continued)

(56) References Cited

U.S. PATENT DOCUMENTS 11,157,867 B1 * 10/2021 Jordan .................. G05D 1/104
2011/0172903 A1 * 7/2011 Farr .................. G01C 21/3461
701/533
(Continued)

FOREIGN PATENT DOCUMENTS

CA 3170561 A1 * 9/2021 ............ B60Q 9/008
JP 2018-132996 A 8/2018
WO WO-2014139821 A1 * 9/2014 ......... G01C 21/3453

OTHER PUBLICATIONS

International Search Report and Written Opinion mailed on Jun. 2, 2020, received for PCT Application PCT/JP2020/008861, Filed on Mar. 3, 2020, 8 pages including English Translation.

*Primary Examiner* — Yonel Beaulieu
(74) *Attorney, Agent, or Firm* — XSENSUS LLP

(57) ABSTRACT

An automotive arithmetic device includes circuitry that calculates a first candidate route based on a vehicle external environment estimated using deep learning; sets a static safe area (SA2) based on a result of recognition of a target object outside a vehicle according to a predetermined rule; and determines a target motion of the motor vehicle. The circuitry selects the first candidate route as a travel route of the motor vehicle under a condition the first candidate route is entirely within the static safe area (SA2), and does not select the first candidate route as the travel route of the motor vehicle when the first candidate route at least partially deviates from the static safe area (SA2).

18 Claims, 13 Drawing Sheets

(58) Field of Classification Search
CPC ....... B60W 2554/00; B60W 30/18163; B60W 60/001; B60W 40/02; B60W 60/0011; B60W 60/0015; G08G 1/167; G08G 1/166; G08G 1/00; G06V 20/58
See application file for complete search history.

(56) References Cited

U.S. PATENT DOCUMENTS

| | | | |
|---|---|---|---|
| 2017/0059344 A1* | 3/2017 | Rothschild | G01C 21/3667 |
| 2017/0267170 A1* | 9/2017 | Be | G01C 21/3679 |
| 2017/0314939 A1* | 11/2017 | Carter | G01C 21/3492 |
| 2018/0164108 A1* | 6/2018 | Rahal-Arabi | G01C 21/3484 |
| 2018/0232636 A1 | 8/2018 | Kawaguchi | |
| 2020/0256688 A1* | 8/2020 | Hirabayashi | G01C 21/3461 |
| 2021/0001810 A1* | 1/2021 | Rivard | G06V 40/172 |
| 2022/0017082 A1* | 1/2022 | Sakashita | B60W 10/188 |
| 2023/0020267 A1* | 1/2023 | Mochizuki | G08G 1/096811 |
| 2023/0359714 A1* | 11/2023 | Cristache | G06F 3/017 |

* cited by examiner

ARITHMETIC OPERATION DEVICE FOR VEHICLE

CROSS-REFERENCE TO RELATED APPLICATIONS

The present application claims priority to international application PCT/JP2020/008861, filed Mar. 3, 2020, Japanese application number 2019-043101 filed in the Japanese Patent Office on Mar. 8, 2019, and Japanese application number 2019-043104 also filed in the Japanese Patent Office on Mar. 8, 2019, the entire contents of each of which being incorporated herein by reference.

TECHNICAL FIELD

The present disclosure relates to an automotive arithmetic device.

BACKGROUND ART

A technique of environmental recognition inside and outside a vehicle using deep learning based on a neural network has been applied to motor vehicles.

For example, Patent Document 1 discloses an estimation device that estimates an occupant's condition with respect to vehicle equipment and includes a memory and a processing unit. The memory stores a model constructed through deep learning using a neural network, and the processing unit receives an image including the equipment, estimates the occupant's condition using the model, and outputs first information indicating a skeleton position of a specific part of the occupant and second information indicating the occupant's condition with respect to the equipment.

CITATION LIST

Patent Document

Patent Document 1: Japanese Unexamined Patent Publication No. 2018-132996

SUMMARY

Technical Problems

In recent years, development of autonomous driving systems has been promoted nationally. In general, an autonomous driving system obtains information of a vehicle external environment using a camera or any other suitable means, and calculates a route that the motor vehicle should take based on the obtained information of the vehicle external environment. What is important for the route calculation is the recognition of the vehicle external environment, and use of deep learning for the recognition of the vehicle exterior environment.

As a concept of software design for functional safety of an arithmetic device that performs autonomous driving, for example, Functional Safety for Road Vehicles standard (ISO 26262) defines ASIL (Automotive Safety Integrity Level) as a hazard assessment index regarding the application of functional safety of a plurality of units constituting a program. According to ASIL, development at a design level corresponding to a functional safety level from ASIL-A to ASIL-D is required.

However, the recognition of the vehicle external environment and the route calculation using deep learning are still under development, and are considered to remain at a safety level around ASIL-B. Therefore, as recognized by the present inventor, in order to give a functional safety level of about ASIL-D to a motor vehicle having the autonomous driving function, it is insufficient to configure the arithmetic device only with the function using deep learning.

The present disclosure has been made in view of the foregoing background, and an aspect thereof is to improve the functional safety level of an automotive arithmetic device having a learned model trained with deep learning.

Solutions to the Problems

The present disclosure is directed to an automotive arithmetic device that is hosted (such as mounted on or contained fully or partially within) on a motor vehicle. The term "automotive arithmetic device" is used interchangeably herein with "automotive arithmetic circuitry". It should be understood that regardless of whether the term "device" or "circuitry" is used, the device/circuitry can be dedicated circuitry, such as an application specific integrated circuit (ASIC) or programmable logic array (PLA), or processor circuitry that executes computer readable instructions to that cause the processor circuitry to perform certain functions by executing processing steps within the processing circuitry. The automotive arithmetic circuitry includes certain "units" which should be construed as structural circuit(s), whether application specific or programmable, that execute certain operations as part of the automotive arithmetic circuitry. The automotive arithmetic device includes automotive arithmetic device includes circuitry that calculates a first candidate route based on a vehicle external environment estimated using deep learning; sets a static safe area (SA2) based on a result of recognition of a target object outside a vehicle according to a predetermined rule; and determines a target motion of the motor vehicle. The circuitry selects the first candidate route as a travel route of the motor vehicle under a condition the first candidate route is entirely within the static safe area (SA2), and does not select the first candidate route as the travel route of the motor vehicle when the first candidate route at least partially deviates from the static safe area (SA2).

According to this configuration, the target object outside the vehicle is recognized according to the predetermined rule separately from the estimation of the vehicle external environment through deep learning. The "predetermined rule" mentioned herein is a method of recognizing a target and the like that has been adopted to the motor vehicles, and the function of recognizing the target object according to the predetermined rule has a functional safety level equivalent to ASIL-D. Therefore, it can be said that the safe area calculated based on the result of a target object recognition unit is a highly safe area.

If the candidate route calculated based on the vehicle external environment estimated through deep learning (will be hereinafter referred to as an "estimated candidate route") is within the safe area, a target motion determination unit determines the estimated candidate route as a route that the motor vehicle should take. This can cause the motor vehicle to travel on a highly safe route. If the estimated candidate route deviates from the safe area, the estimated candidate route is not selected as the route that the motor vehicle should take. In this case, for example, the automotive arithmetic device may recalculate a route passing the safe area based on information of a target object recognized according to the predetermined rule, or may leave a driver to drive if the driver is on board, so that the motor vehicle can travel on a highly safe route.

This can improve the functional safety level of the arithmetic device having the function of using a model trained by deep learning.

The automotive arithmetic device may further include a dynamic safe area setting unit that sets a dynamic safe area which is an area that the motor vehicle is able to pass based on the estimation result of the vehicle external environment estimation unit. The first candidate route may be a route that passes the dynamic safe area calculated by a dynamic safe area setting unit.

In an aspect of the automotive arithmetic device, the automotive arithmetic device further includes a second route calculation unit that calculates a second candidate route that passes the static safe area only. A target motion determination unit selects the second candidate route as a route that the motor vehicle should take and determines the target motion of the motor vehicle so that the motor vehicle takes the second candidate route when the first candidate route at least partially deviates from the static safe area.

This configuration can cause the motor vehicle to travel on a highly safe route. Specifically, since the route calculated based on the recognition of the target object according to the predetermined rule is selectable, the functional safety level equivalent to ASIL-D, which cannot be obtained by an arithmetic device using deep learning only, can be achieved.

In the above-described aspect, the first candidate route calculated by the first route calculation unit may include a plurality of first candidate routes. When at least one of the plurality of first candidate routes passes the static safe area only, the target motion determination unit may select the first candidate route that passes the static safe area only as a route that the motor vehicle should take, and the target motion determination unit may select the second candidate route as the route that the motor vehicle should take when all the plurality of first candidate routes partially deviate from the static safe area.

This configuration can cause the motor vehicle to travel on a highly safe route more effectively. For example, if some of the plurality of first candidate routes deviate from the safe area and the rest of the candidate routes are within the safe area, one of the rest of the candidate routes is selected as the route that the motor vehicle should take. If all the plurality of first candidate routes deviate from the safe area, the second candidate route calculated based on the information of the target object recognized according to the predetermined rule is selected as described above, so that the motor vehicle can travel on a highly safe route.

In the above-described aspect, the first and second route calculation units may set a destination forward of the motor vehicle, and respectively calculate the first and second candidate routes to the destination. When the motor vehicle has arrived at the destination, the first and second route calculation units may set a new different destination, and respectively calculate another first candidate route and another second candidate route to the new different destination.

In the above-described aspect, the automotive arithmetic device may further include: a first arithmetic system including the first route calculation unit; and a second arithmetic system including the second route calculation unit and independent of the first arithmetic system.

In the above-described aspect of the automotive arithmetic device including the first and second arithmetic systems, the first arithmetic system may include a dynamic safe area setting unit that sets a dynamic safe area which is an area that the motor vehicle is able to pass based on the estimation result of the vehicle external environment estimation unit, and the second arithmetic system may include the static safe area setting unit.

Advantages

As can be seen from the foregoing description, the present disclosure can improve the functional safety level of an arithmetic device having the function of using deep learning.

DESCRIPTION OF EMBODIMENTS

An exemplary embodiment will be described in detail below with reference to the drawings.

First Embodiment

Figure 1:
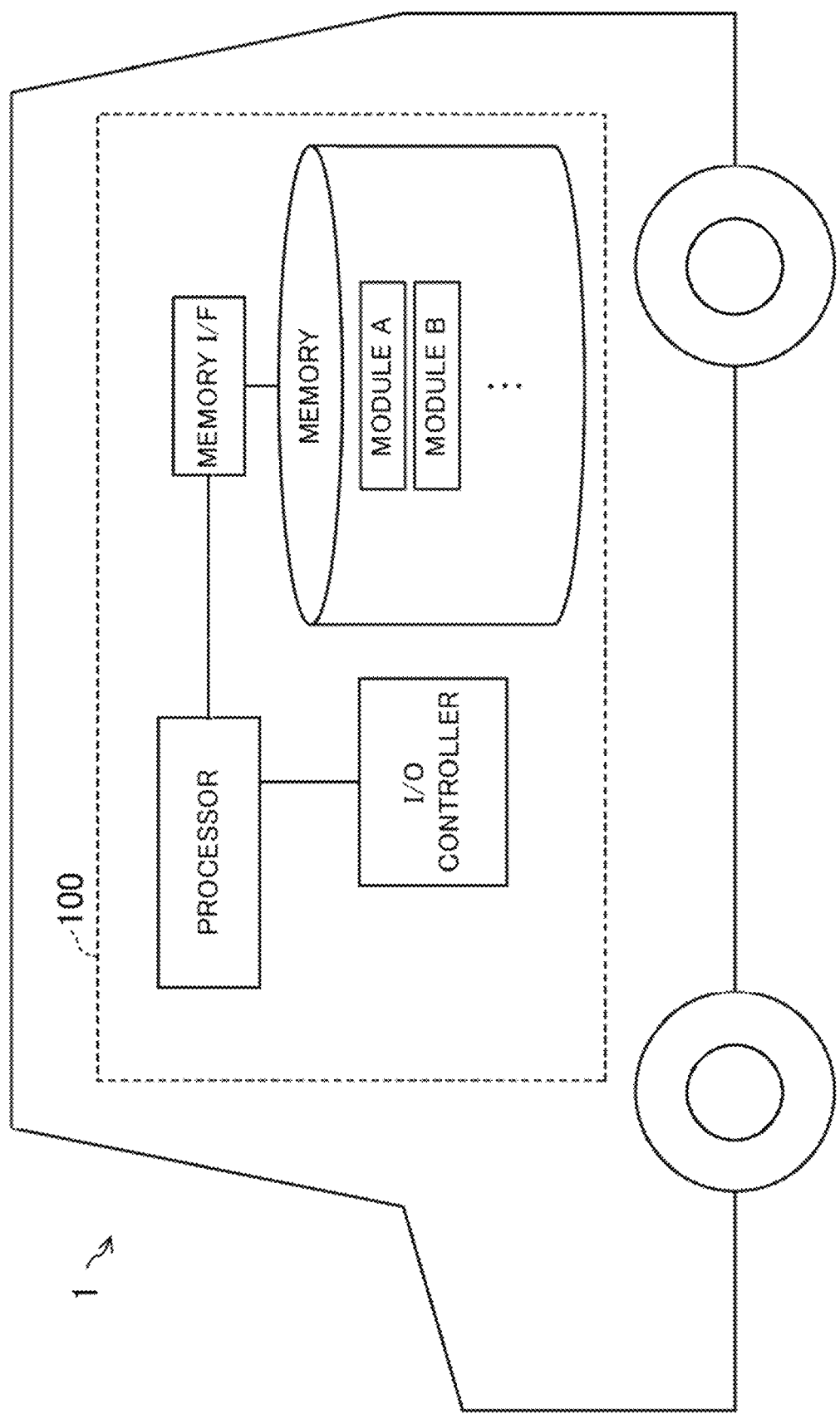
FIG. 1 is a schematic view showing a motor vehicle equipped with an arithmetic device according to a first embodiment.
Figure 8:
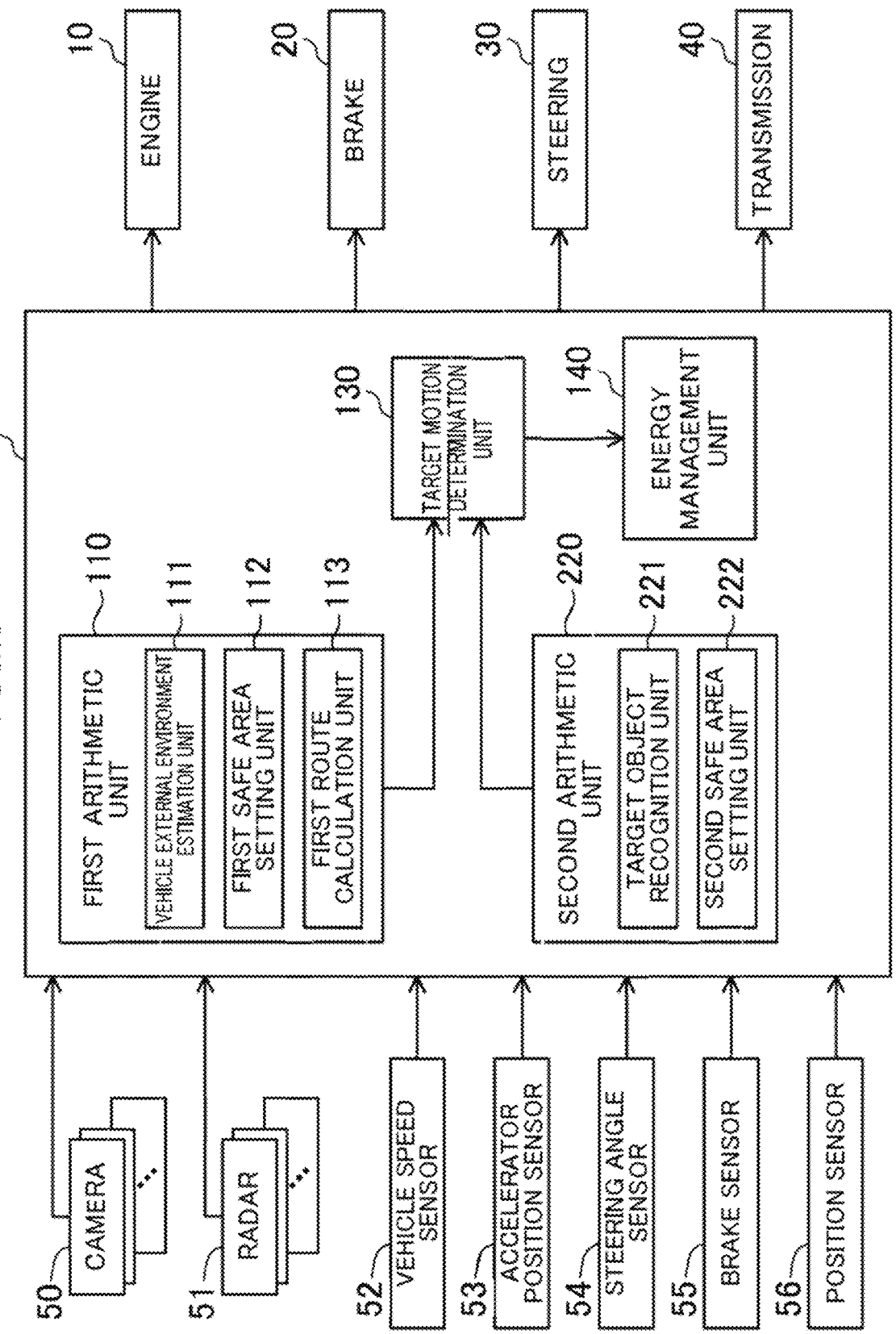
FIG. 8 is a block diagram illustrating a functional configuration of an automotive arithmetic device according to a second embodiment.

FIG. 1 schematically shows a motor vehicle 1 equipped with an automotive arithmetic device, the circuitry for which will later be discussed in more detail with respect to FIGS. 8 and 9. The automotive arithmetic device will be hereinafter abbreviated as an "arithmetic device 100") according to a first embodiment. The arithmetic device 100 is, for example, an arithmetic device mounted on a four-wheel motor vehicle 1, and is able to communicate wirelessly with off-vehicle computer resources via wireless communications, such as LTE, and 5G. The motor vehicle 1 is a motor vehicle that can be driven manually in accordance with the operation of an accelerator, steering wheel, and the like by a driver, can assist the driver's operation during driving, and can be driven autonomously without the driver's operation. In the following description, the motor vehicle 1 equipped with the arithmetic device 100 may be referred to as a "subject vehicle 1" in order to distinguish the motor vehicle 1 from other vehicles.

The arithmetic device 100 is computer hardware (circuitry) that executes software, and specifically includes a processor including a CPU, and a non-transitory memory that stores executable code including a plurality of modules, for example, as will be discussed in more detail with respect to FIG. 9. As used herein, the term "circuitry" may be one or more circuits that optionally include programmable circuitry. The arithmetic device 100 includes a memory I/F responsible for communication between the processor and the memory, an I/O controller responsible for communication between the processor 101 and the outside of the arithmetic device 100.

Figure 2:
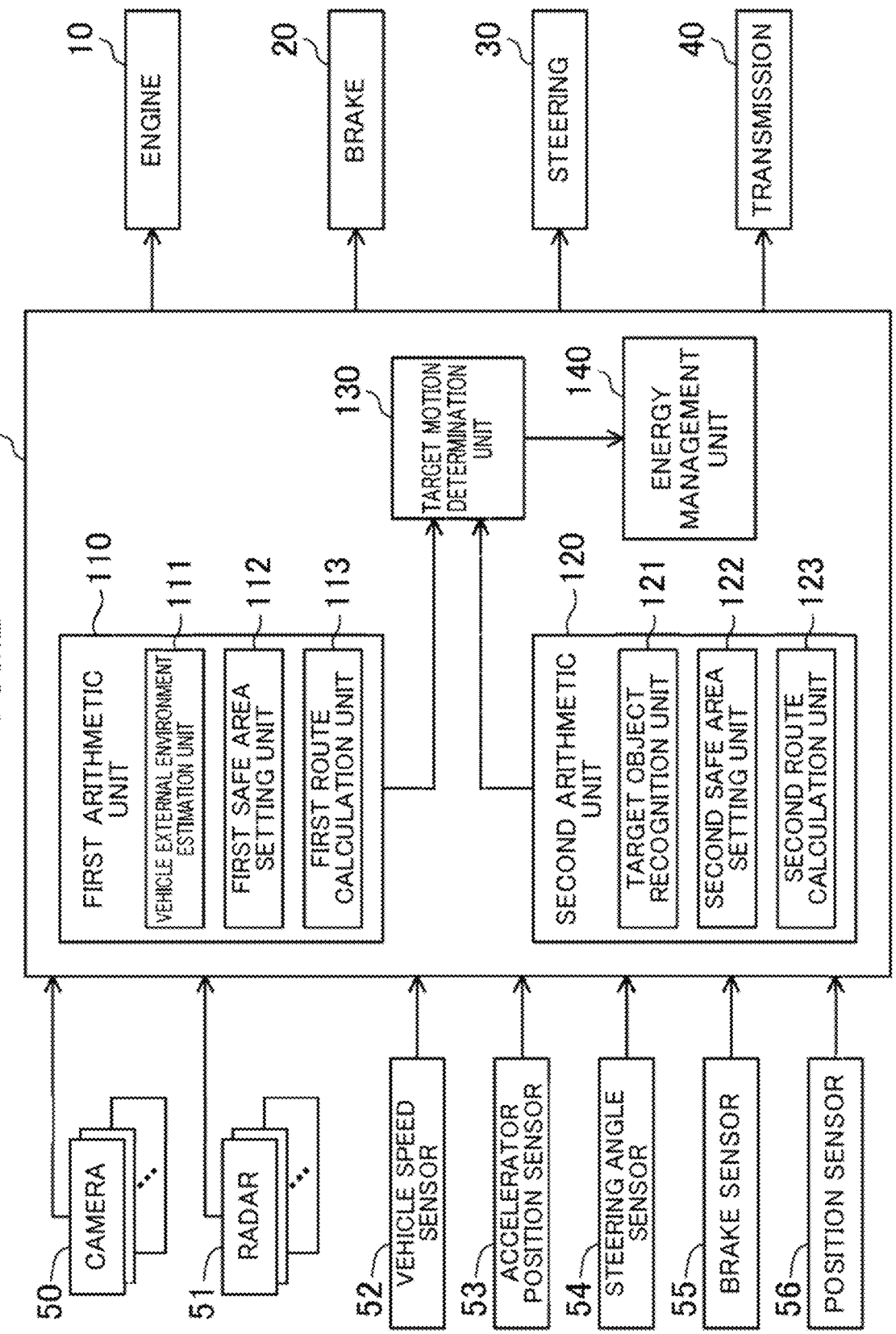
FIG. 2 is a block diagram showing a functional configuration of the arithmetic device.

FIG. 2 shows some of components of the arithmetic device 100. Among the components of the arithmetic device 100, FIG. 2 shows those for exhibiting the function according to the present embodiment (a route generating function described later). Not all the functions of the arithmetic unit 100 are shown. Furthermore, the respective "units" are configured as computing hardware of the arithmetic device 100, which may be programmed with software code to perform described functions.

As shown in FIG. 2, the arithmetic device 100 determines a target motion of the motor vehicle 1 based on outputs from a plurality of sensors and any other suitable components, and controls the actuation of devices. The sensors and the like that output information to the arithmetic device 100 include: a plurality of cameras 50 disposed on or in a body or the like of the motor vehicle 1 to take images of a vehicle external environment; a plurality of radars 51 provided on or in the body or the like of the motor vehicle 1 to detect targets or the like outside the vehicle via returns of radio frequency (RF) transmissions or other wireless transmissions such as infrared transmissions/returns; a vehicle speed sensor 52 that detects an absolute velocity of the motor vehicle 1; an accelerator position sensor 53 that detects how much an accelerator pedal of the motor vehicle 1 is depressed; a steering angle sensor 54 that detects a rotational angle (steering angle) of a steering wheel of the motor vehicle 1; a brake sensor 55 that detects how much a brake pedal of the motor vehicle 1 is depressed; and a position sensor 56 that detects the position of the motor vehicle 1 (vehicle position information) using Global Positioning System (GPS). Objects controlled by the arithmetic device 100 include an engine 10, a brake 20, and a steering 30, each of which receive control signals, directly or indirectly, from the arithmetic device 100.

The cameras 50 are arranged to take images of the surroundings of the motor vehicle 1 from 0 degrees through 360 degrees in the horizontal direction. Each of the cameras 50 generates image data by capturing an optical image showing the vehicle external environment. Each of the cameras 50 outputs the image data generated to the arithmetic device 100. The cameras 50 are an example of an information acquisition device that acquires information of the vehicle external environment.

The radars 51 are arranged so that their detection range also covers 0 degrees through 360 degrees about the motor vehicle 1 in the horizontal direction, just like the cameras 50. The type of the radars 51 is not particularly limited. For example, millimeter wave radars or infrared radars can be adopted. The radars 51 are an example of the information acquisition device that acquires information of the vehicle external environment.

The engine 10 is a power drive source, and includes an internal combustion engine (a gasoline engine or a diesel engine). The arithmetic device 100 outputs an engine output alteration signal to the engine 10 when the motor vehicle 1 needs to be accelerated or decelerated. The engine 10 is controlled by the degree of depression of the accelerator pedal by the driver during manual driving, but is controlled based on a target motion calculated by the arithmetic device 100 during assisted driving and autonomous driving. Although not shown, a generator that generates electric power by the output of the engine 10 is connected to a rotational shaft of the engine 10.

The brake 20 is an electric brake. When the motor vehicle 1 needs to slow down, the arithmetic device 100 outputs a brake request signal to the brake 20. The brake 20 that has received the brake request signal operates a brake actuator (not shown) based on the brake request signal to decelerate the motor vehicle 1. The brake 20 is controlled by the degree of depression of the brake pedal by the driver during the manual driving, but is controlled based on the target motion calculated by the arithmetic device 100 during the assisted driving and the autonomous driving.

The steering 30 is an electric power steering (EPS). The arithmetic device 100 outputs a steering direction alteration signal to the steering 30 when the traveling direction of the motor vehicle 1 needs to be changed. The steering 30 is controlled by the degree of handling of a steering wheel (a so-called wheel) by the driver during the manual driving, but is controlled based on the target motion calculated by the arithmetic device 100 during the assisted driving or the autonomous driving.

The transmission 40 is a multi-speed transmission. The arithmetic device 100 outputs a gear change signal to the transmission 40 in accordance with the driving force to be outputted. The transmission 40 is controlled by the handling of a shift lever by the driver and the degree of depression of the accelerator pedal by the driver during the manual driving, but is controlled based on the target motion calculated by the arithmetic device 100 during the assisted driving and the autonomous driving.

During the manual driving, the arithmetic device 100 outputs a control signal based on the output of the accelerator position sensor 53 or the like to the engine 10, for example. During the assisted driving or the autonomous driving, the arithmetic device 100 sets a travel route of the motor vehicle 1, and outputs the control signal to the engine 10 and the like so that the motor vehicle 1 travels on the travel route. The arithmetic device 100 includes, as components for generating the control signal to the engine 10 and the like during the assisted driving and the autonomous driving, a first arithmetic system 110 having the function of estimating a vehicle external environment using a model developed via deep learning (as will be discussed), a second arithmetic system 120 having the function of recognizing a target object based on a predetermined rule without using deep learning, a target motion determination unit 130 (as further described in more detail in U.S. application Ser. No. 17/159,178, filed Jan. 27, 2021, the entire contents of which being incorporated herein by reference) that receives outputs from the first and second arithmetic systems 110 and 120 and determines the target motion of the motor vehicle 1, and an energy management unit 140 (as further described in more detail in U.S. application Ser. No. 17/159,178, supra) that calculates the amount of control of the devices (e.g., the engine 10 described later) at the highest energy efficiency to achieve the target motion determined by the target motion determination unit 130. The first arithmetic system 110, the second arithmetic system 120, the target motion determination unit 130, and the energy management unit 140 are examples of computer-executable instructions saved as modules that are stored in the memory and configure a processor to perform the operations once the processor executes the instructions.

The first arithmetic system 110 includes a vehicle external environment estimation unit 111 (as further described in U.S. application Ser. No. 17/120,292 filed Dec. 14, 2020, and U.S. application Ser. No. 17/160,426 filed Jan. 28, 2021, the entire contents of each of which being incorporated herein by reference) that estimates the vehicle external environment using a model trained with deep learning based on the outputs from the cameras 50 and the radars 51, a first safe area setting unit 112 that sets a first safe area SA1 (see FIG. 4) with respect to the vehicle external environment estimated by the vehicle external environment estimation unit 111, and a first route calculation unit 113 (an example of which is further described in more detail in U.S. application Ser. No. 17/161,691, filed 29 Jan. 2021, U.S. application Ser. No. 17/161,686, filed 29 Jan. 2021, and U.S. application Ser. No. 17/161,683, the entire contents of each of which being incorporated herein by reference) that calculates a first candidate route based on the estimation result of the vehicle external environment estimation unit 111 and the first safe area SA1 set by the first safe area setting unit 112. The vehicle external environment estimation unit 111, the first safe area setting unit 112, and the first route calculation unit 113 are examples of the modules included in the first arithmetic system 110.

The vehicle external environment estimation unit 111 estimates the vehicle external environment through image recognition processing using a model trained via deep learning based on the outputs of the cameras 50 and the radars 51. Specifically, the vehicle external environment estimation unit 111 constructs object identification information through deep learning based on image data from the cameras 50, and integrates the object identification information with positioning information from the radars to create a 3D map representing the vehicle external environment. Further, for example, estimation of objects' behavior based on deep learning is integrated with the 3D map to generate an environment model. The deep learning uses, for example, a multilayer neural network (deep neural network (DNN)). Examples of the multilayer neural network include a convolutional neural network (CNN), as will be discussed with respect to FIGS. 10-13.

The first safe area setting unit 112 sets the first safe area SA1 with respect to the 3D map generated by the vehicle external environment estimation unit 111. The first safe area SA1 is set using a model constructed through deep learning as an area which the subject vehicle can pass. The model is constructed, for example, through reconstruction of a model previously constructed for each type of the motor vehicle 1 based on, e.g., the past driving history of the driver. The first safe area SA1 is basically an area on the road (as well as elevated areas, co-planar with the road, at vehicle heights above the area on the road, so as to detect unusual aspects of obstacles, such as a ladder strapped to the roof of a vehicle) without any dynamic obstacle such as other vehicles or pedestrians, and any static obstacle such as a median strip or traffic poles. The first safe area SA1 may include a space of a road shoulder where the vehicle can stop in case of emergency. The first safe area setting unit 112 corresponds to a dynamic safe area setting unit.

The first route calculation unit 113 calculates a first candidate route that passes within the first safe area SA1 set by the first safe area setting unit 112. The first route calculation unit 113 calculates the first candidate route using reinforcement learning. The reinforcement learning is the function of setting an evaluation function for the result of a series of simulation (the candidate route in this example), and giving a high rating to the simulation result that meets a certain purpose, or a low rating to the simulation result that does not meet the certain purpose, thereby learning a candidate route that meets the purpose. An actual calculation method will be described later.

The second arithmetic system 120 includes a target object recognition unit 121 that recognizes a target object outside the vehicle based on the outputs from the cameras 50 and the radars 51 according to a predetermined rule without using deep learning, a second safe area setting unit 122 that sets a second safe area SA2 (see FIG. 5) based on the recognition result of the target object recognition unit 121, and a second route calculation unit 123 that calculates a second candidate route based on the recognition result of the target object recognition unit 121 and the second safe area SA2 set by the second safe area setting unit 122. The target object recognition unit 121, the second safe area setting unit 122, and the second route calculation unit 123 are examples of the modules included in the second arithmetic system 120.

The target object recognition unit 121 recognizes the target object based on the existing predetermined rule. Examples of the target object include traveling vehicles, parked vehicles, and pedestrians. The target object recognition unit 121 also recognizes a relative distance and a relative speed between the subject vehicle and the target object. The target object recognition unit 121 also recognizes a roadway (including a lane marker and the like) based on the outputs from the cameras 50 and the radars 51.

The second safe area setting unit 122 sets a second safe area SA2 as an area where a collision with the target object recognized by the target object recognition unit 121 can be avoided. The second safe area SA2 is set based on a predetermined rule, e.g., an area of several meters around the target object is considered as a range where the collision is unavoidable. The second safe area setting unit 122 is configured to be able to set the second safe area SA2 in consideration of the speed of traveling vehicles and the speed of pedestrians. Just like the first safe area SA1, the second safe area SA2 is basically an area on the road without any dynamic obstacle such as other vehicles or pedestrians, and any static obstacle such as a median strip or traffic poles. The second safe area SA2 may include a space of a road shoulder where the vehicle can stop in case of emergency. The second safe area setting unit 122 corresponds to a static safe area setting unit.

The second route calculation unit 123 calculates a second candidate route that passes within the second safe area SA2 set by the second safe area setting unit 122. An actual calculation method will be described later.

Receiving the outputs from the first and second arithmetic systems 110 and 120, especially the information of the first and second safe areas SA1 and SA2 and the information of the first and second candidate routes, the target motion determination unit 130 determines the target motion of the motor vehicle 1. The target motion determination unit 130 sets a route that the motor vehicle 1 should take, and determines the operation amount (e.g., an engine torque or the operation amount of the brake actuator) required for the devices (mainly, the engine 10, the brake 20, the steering 30, and the transmission 40) to cause the motor vehicle 1 to travel on the route.

The energy management unit 140 calculates the amount of control of the devices (such as the engine 10 described later) at the highest energy efficiency to achieve the operation amount required for the devices determined by the target motion determination unit 130.

For example, when outputting the required driving force determined by the target motion determination unit 130, the energy management unit 140 calculates the number of speeds of the transmission 40, the timing of opening or closing intake/exhaust valves (not shown), and the timing of injecting the fuel from injectors (not shown), so that the fuel consumption of the engine 10 is minimized. When outputting a target braking force, the energy management unit 140 generates the braking force by increasing the amount of regenerative power of the generator connected to the engine 10 or the driving load of a cooling compressor so that the operation amount of the engine brake is minimized. Further, the energy management unit 140 controls the vehicle speed and the steering angle so that the rolling resistance applied to the motor vehicle 1 during cornering is minimized. Specifically, the generation of the braking force and the timing of the steering are controlled so that rolling is induced in synchronization with pitching that lowers a front portion of the motor vehicle 1 to give rise to diagonal rolling. Giving rise to the diagonal rolling increases the load applied to the turning outer front wheel. This allows the vehicle to corner at a small steering angle, and can reduce the rolling resistance applied to the motor vehicle 1.

A method of calculating the first candidate route will be described below with reference to FIG. 3. Although the first safe area SA1 is not illustrated in FIG. 3, it is illustrated in FIG. 4, and the first candidate route to be calculated is a route that passes within the first safe area SA1. The first candidate route is calculated when the driving mode of the motor vehicle 1 is in the assisted driving mode or the autonomous driving mode, and is not calculated in the manual driving mode.

Figure 3:
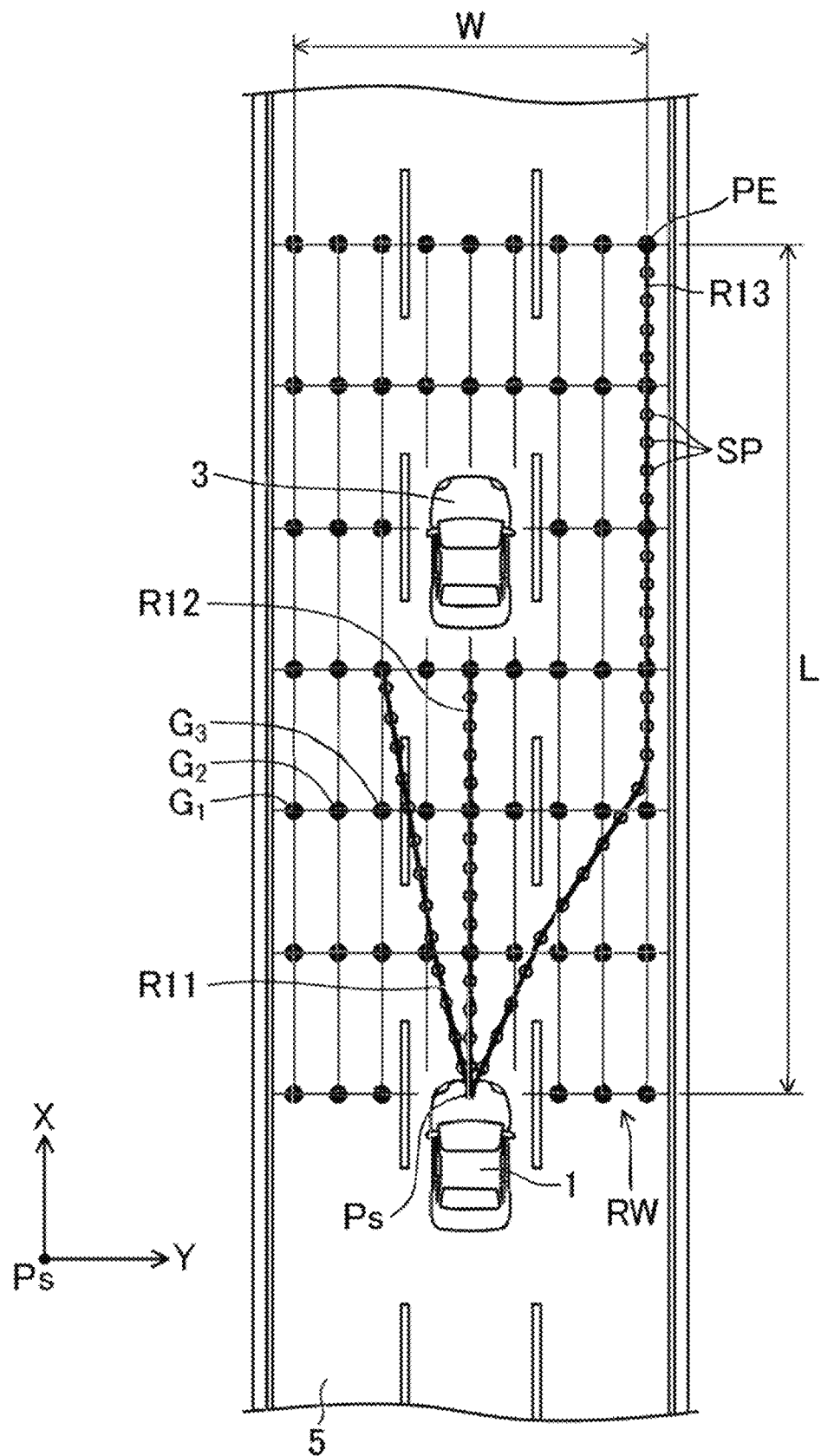
FIG. 3 is a view showing an example of a travel route set by the arithmetic device.
Figure 4:
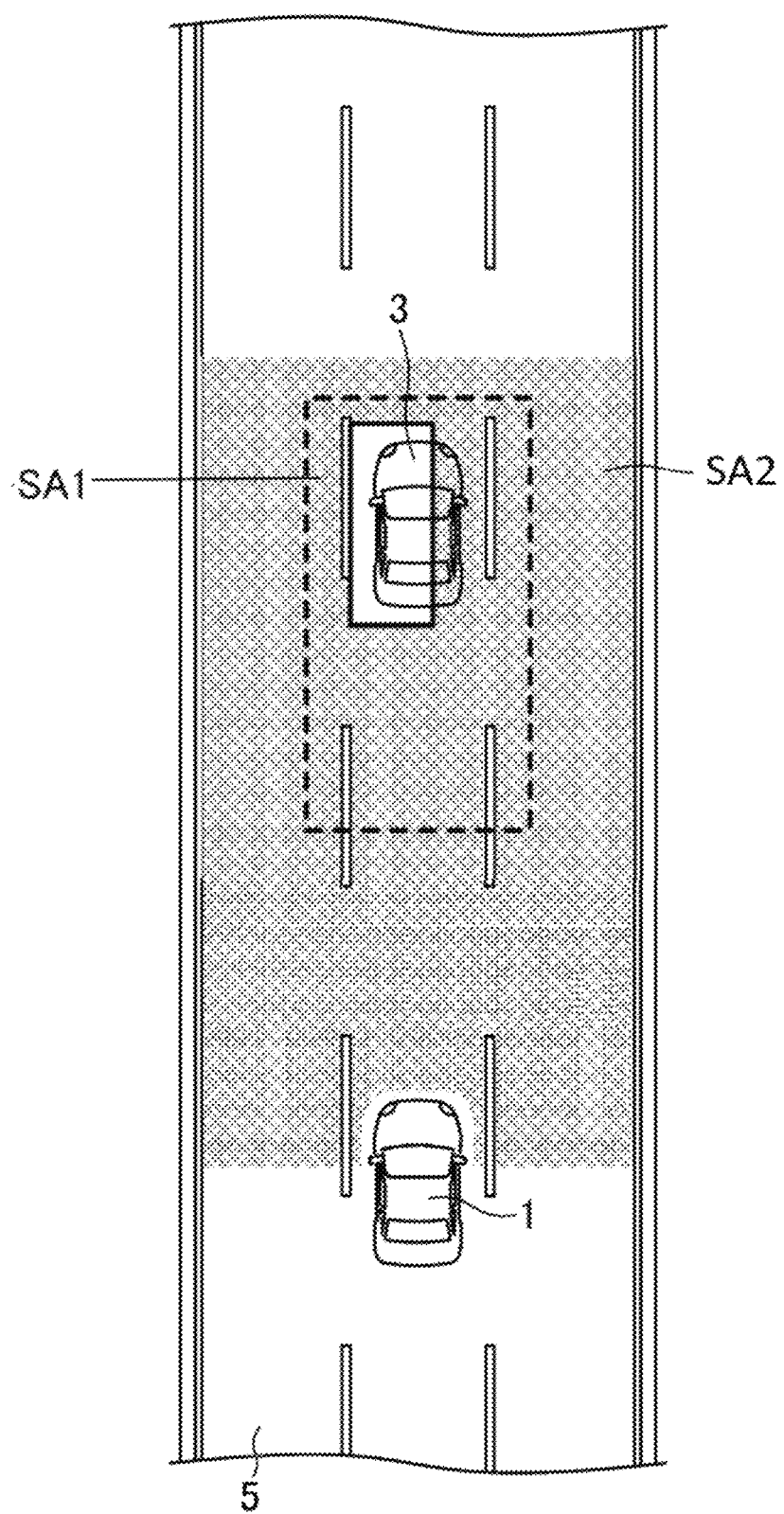
FIG. 4 is a view showing a comparison between a safe area set by a first arithmetic system and a safe area set by a second arithmetic system.

First, as shown in FIG. 3, the first route calculation unit 113 executes grid point set processing based on roadway information. In the grid point set processing, an ECU 10 first specifies the shape of the roadway 5 (i.e., the direction in which the roadway 5 extends and the width of the roadway), and sets a grid area RW including grid points Gn (n=1, 2, . . . , N) on the roadway 5.

The grid area RW ranges from the periphery of the subject vehicle 1 to a predetermined distance ahead of the subject vehicle 1 along the roadway 5. The distance (longitudinal length) L is calculated based on the current vehicle speed of the subject vehicle 1. In the present embodiment, the distance L (L=V×t) is a distance that the vehicle is expected to travel at the current vehicle speed (V) for a predetermined fixed time t (e.g., three seconds). However, the distance L may be a predetermined fixed distance (e.g., 100 m) or may be a function of the vehicle speed (and acceleration). The width W of the grid area RW is set to be the width of the roadway 5.

The grid area RW is divided into a large number of rectangular grid sections by a plurality of grid lines extending along the extending direction X and width direction (lateral direction) Y of the roadway 5. Points of intersection of the grid lines in the X and Y directions are grid points Gn. Intervals in the X and Y directions between the grid points Gn are respectively set to fixed values. In the present embodiment, for example, the grid interval in the X direction is 10 m, and the grid interval in the Y direction is 0.875 m. The grid interval may be a variable value according to the vehicle speed or the like.

The roadway 5 shown in FIG. 3 is a straight section, and the grid area RW and the grid sections are respectively set in a rectangular shape. When the roadway includes a curved section, the grid area and the grid sections may or may not be set in a rectangular shape.

Next, in the calculation of the first candidate route, the first route calculation unit 113 sets a predetermined grid point GT in the grid area RW as a target reach position PE, and sets the target speed at the target reach position PE (GT) in accordance with an external signal. The external signal is, for example, a guidance signal that guides the subject vehicle 1 to a destination (e.g., a parking area) transmitted from a navigation system (not shown) mounted on the subject vehicle 1.

Next, the first route calculation unit 113 executes candidate route arithmetic processing. In this candidate route arithmetic processing, the first route calculating unit 113 first executes candidate route calculation processing for calculating a plurality of first candidate routes R1$m$ (m=1, 2, 3, . . . ). This processing is similar to the calculation of the candidate route using the existing state lattice method.

The outline of the calculation of the candidate routes will be described below. The first route calculation unit 113 creates candidate routes from the current position PS (start point) of the subject vehicle 1 to each grid point Gn (end point) in the grid area RW. The first route calculation unit 113 also sets speed information at the end point.

The start point and the end point are connected via one or more grid points Gn or no grid points Gn. For each of the first candidate routes R1$m$, the first route calculation unit 113 calculates position information by setting a route curve pattern that connects the grid points, and calculates a profile of speed change to be in conformity with a speed change pattern. The speed change pattern is generated as a combination of sharp acceleration (e.g., 0.3 G), slow acceleration (e.g., 0.1 G), constant vehicle speed, slow deceleration (e.g., −0.1 G), and sharp deceleration (e.g., −0.3 G), and is set not for each grid but for a predetermined length (e.g., 50 m to 100 m) of the first candidate route R1$m$.

Further, the first route calculation unit 113 sets sampling points SP for each candidate route, and calculates speed information at each sampling point SP. FIG. 3 shows only three first candidate routes R11, R12, R13 of a large number of candidate routes. In the present embodiment, each of the first candidate routes R1$m$ is a route from the start point to a position at which the vehicle arrives after a fixed time (e.g., three seconds).

Next, the first route calculation unit 113 calculates a route cost taken by the obtained first candidate routes R1$m$. In the calculation of the route cost of each first candidate route R1$m$, the first route calculation unit 113 calculates, for each sampling point SP, an inertia force Fi due to the motion of the vehicle 1, collision probability Pc with an obstacle (the other vehicle 3 in this example), and an impact force Fc applied to the occupant upon the collision (or a reaction force against the collision), and calculates external forces FC to be applied to the occupant based on these values, thereby obtaining the sum of the external forces FC (absolute values) at all the sampling points SP on the first candidate route R1$m$ as the route cost (candidate route cost) EPm of the first candidate route R1$m$. Further explanation of how a route cost may be determined is described in U.S. patent application Ser. No. 16/739,144, filed on Jan. 10, 2020, the entire contents of which is incorporated herein by reference.

Then, the first route calculation unit 113 outputs all the first candidate routes R1*m* to the target motion determination unit 130 together with their route cost information.

The candidate route is set in this manner. The second candidate route is basically calculated in the same manner as described above. As the second candidate route, a route having the lowest route cost is selected and outputted to the target motion determination unit 130.

In the first embodiment, the candidate routes include the first candidate route calculated by the first arithmetic system 110 and the second candidate route calculated by the second arithmetic system 120, but the target motion determination unit 130 basically adopts the first candidate route. This is because the first candidate route set by using the deep learning or the reinforcement learning is more likely to be a route reflecting the intention of the driver, that is, a route that does not cause the driver to feel redundancy such as excessive caution in avoiding an obstacle.

However, the recognition of the vehicle external environment using deep learning is adaptive and may not be ideal at any given instant. That is, with an environment model constructed by using deep learning, accurate information can be calculated in a range where the information obtained from the cameras 50 and the like is similar to information on which the environment model is based. However, if an actual vehicle external environment obtained from the cameras 50 and the like greatly differs from the environment model, a vehicle external environment that is deviated from the actual vehicle external environment may be estimated.

For example, FIG. 4 illustrates the first safe area SA1 set by the first safe area setting unit 112 and the second safe area SA2 set by the second safe area setting unit 122. The first safe area SA1 is a hatched portion in FIG. 4, and the second safe area SA2 is the hatched portion except for the inside of a dashed frame in FIG. 4. As shown in FIG. 4, part of the other vehicle 3 is included in the first safe area SA1. This may occur when the width of the other vehicle 3, or the width of the vehicle above road level, such as a trunk-level, rear-view mirror level, or roof-level, cannot be accurately estimated in image recognition by deep learning.

As described above, in the recognition of the vehicle external environment using deep learning, the vehicle external environment deviating from the actual vehicle external environment may be estimated in some cases. Therefore, the function using deep learning is considered to be equivalent to safety level ASIL-B in the functional safety level (ASIL) defined by Functional Safety for Road Vehicles standard (ISO 26262). Thus, as recognized by the present inventor, some contrivance is required to improve the functional safety level.

Therefore, in the first embodiment, when the first candidate route is within the second safe area SA2, the target motion determination unit 130 of the arithmetic device 100 selects the first candidate route as the route that the motor vehicle 1 (the subject vehicle 1) should take and determines the target motion of the motor vehicle 1 so that the motor vehicle 1 takes the first candidate route. On the other hand, when the first candidate route deviates from the second safe area SA2, the target motion determination unit 130 does not select the first candidate route as the route that the motor vehicle 1 should take. More specifically, if all of the plurality of first candidate routes R1*n* (n=1, 2, 3, . . . ) set as the candidate routes deviate from the second safe area SA2 in the calculation of the first candidate route, the target motion determination unit 130 selects the second candidate route as the route that the motor vehicle 1 should take.

Figure 5:
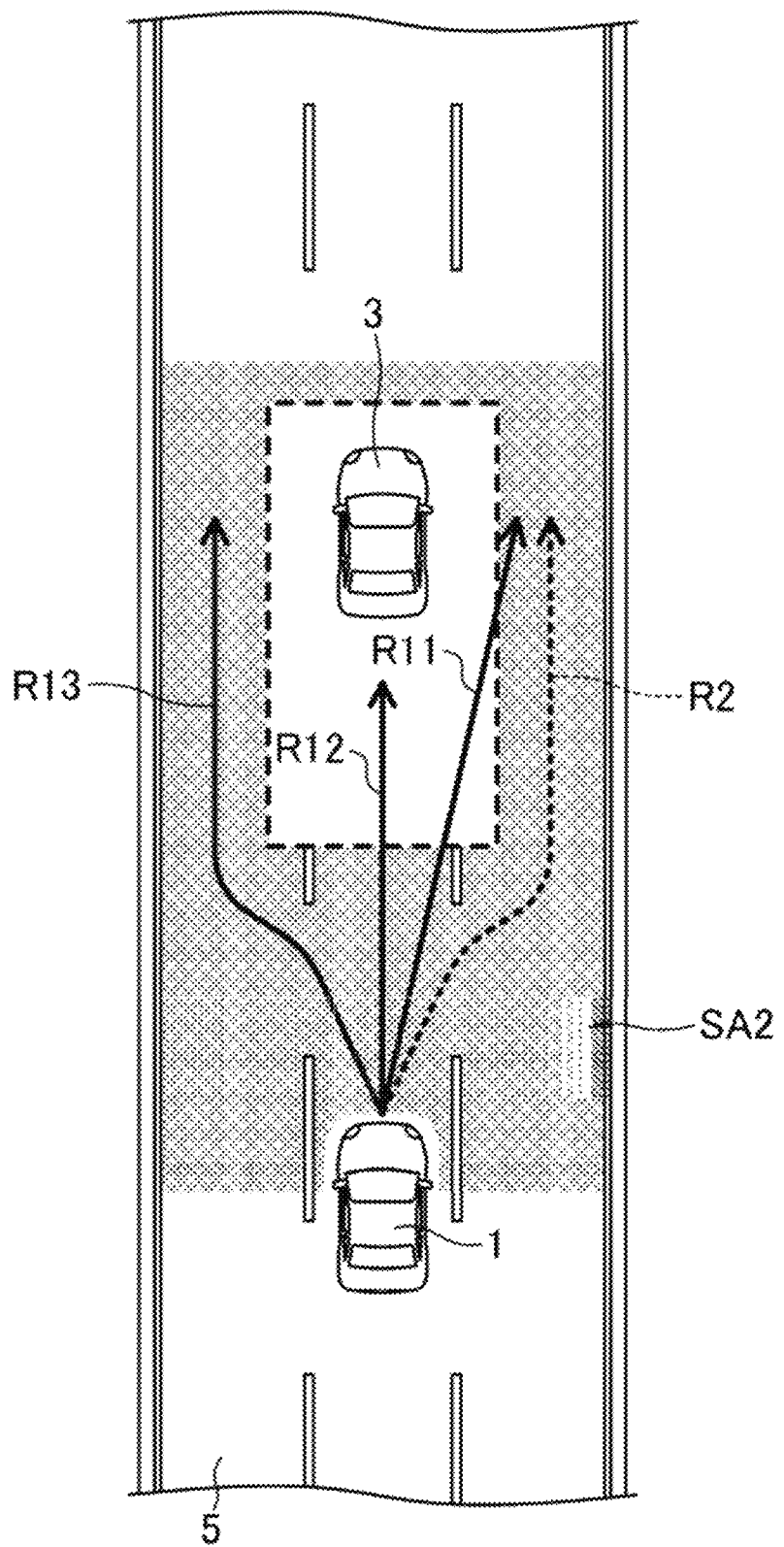
FIG. 5 is a view illustrating an example of relationship between a candidate route calculated based on a vehicle external environment estimated through deep learning and a safe area.

For example, suppose that the first candidate routes R11, R12, and R13 are set by the first route calculation unit 113 as illustrated in FIG. 5. Among the three first candidate routes R11 to R13, the routes R11 and R12 partially deviate from the second safe area SA2 (i.e., R11 and R12 enter the region within the dashed lines that surround vehicle 3), but the route R13 exclusively within the second safe area SA2. At this time, the target motion determination unit 130 does not select the routes R11 and R12, which include path-segments that are outside the second safe area SA2, as the route that the motor vehicle 1 should take, but selects the route R13 as the route that the motor vehicle 1 should take.

Figure 6:
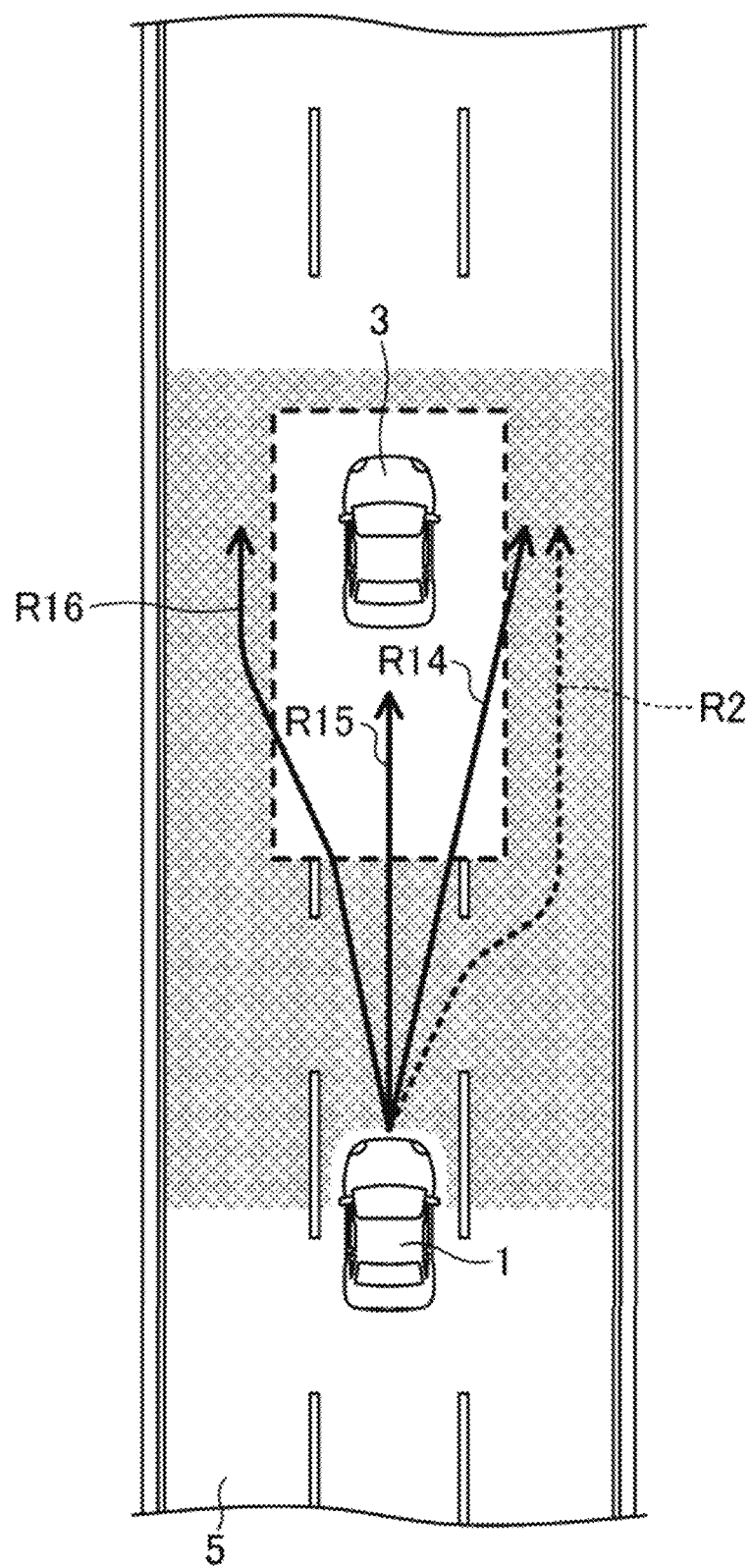
FIG. 6 is another view illustrating an example of relationship between the candidate route calculated based on the vehicle external environment estimated through deep learning and the safe area.

On the other hand, suppose that the first candidate routes R14, R15, and R16 are set by the first route calculation unit 113 as illustrated in FIG. 6. All the three first candidate routes R14 to R16 include path segments that are outside the second safe area SA2. In this case, the target motion determination unit 130 selects the second candidate route R2 having the lowest route cost among the plurality of second candidate routes calculated by the second arithmetic system 120 as the route that the motor vehicle 1 should take.

The target object recognition unit 121 recognizes the target object based on the existing predetermined rule, and thus, can accurately recognize the size of the target object. In addition, the second safe area setting unit 122 sets the second safe area SA2 based on a predetermined rule, e.g., an area of several meters around the target object is considered as a range where the collision is unavoidable. Thus, the second candidate route is a route that can ensure a sufficient distance from the other vehicle 3 even when avoiding the collision with the other vehicle 3. Specifically, the function of the second arithmetic system 120 can be equivalent to ASIL-D. Therefore, if all the plurality of first candidate routes R1*n* set as the candidate routes deviate from the second safe area SA2 in the calculation of the first route, the target motion determination unit 130 selects the second candidate route as the route that the motor vehicle 1 should take, so that the motor vehicle 1 can travel on a highly safe route. Accordingly, the arithmetic device 100 having the function of using deep learning can improve the functional safety level.

Figure 7:
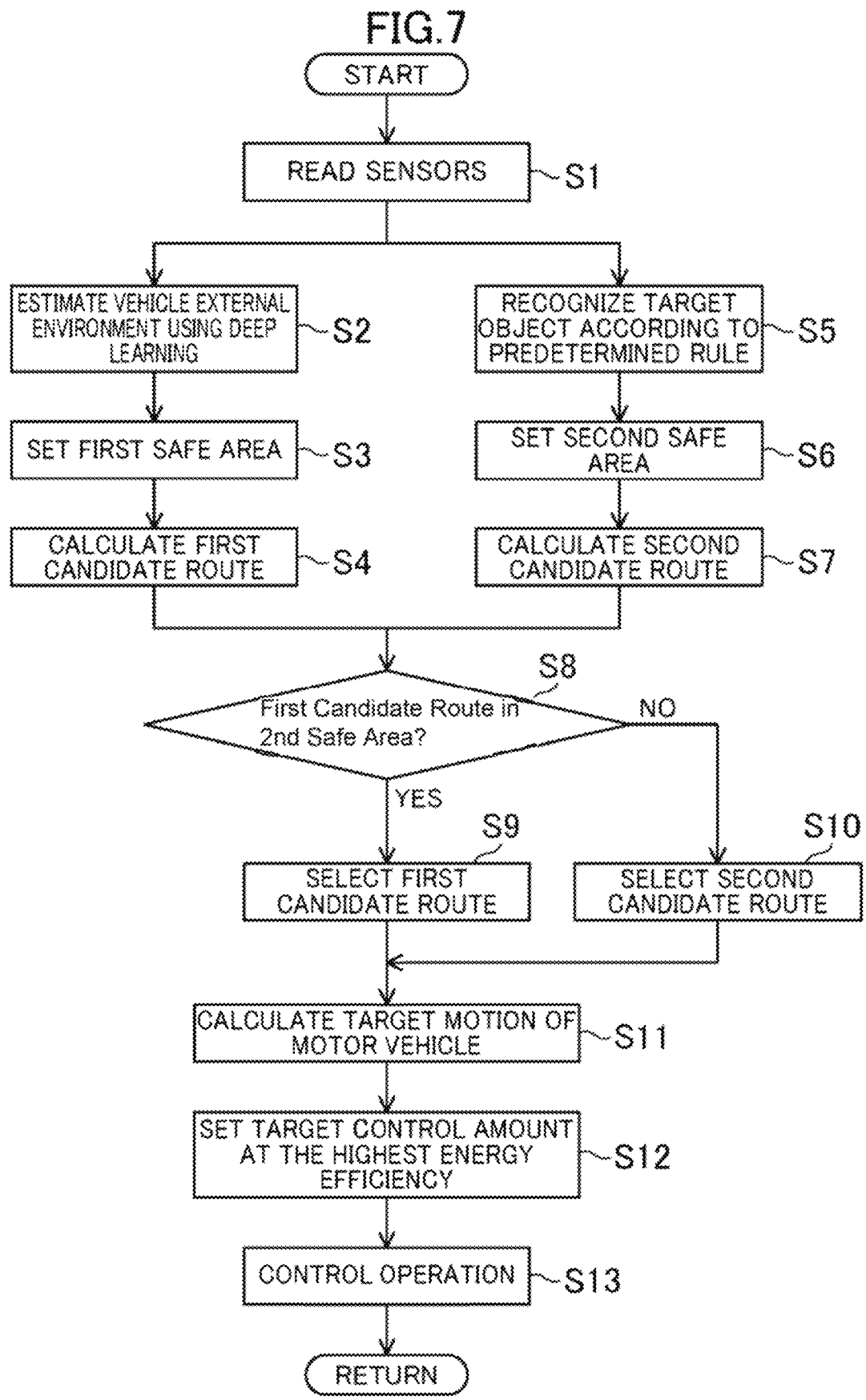
FIG. 7 is a flowchart of how a driving route of a motor vehicle is determined.

A processing operation of the arithmetic device 100 for determining the driving route of the motor vehicle 1 will be described below with reference to the flowchart of FIG. 7. The motor vehicle 1 is in the assisted driving mode or the autonomous driving mode.

First, in step S1, the arithmetic device 100 reads information from the cameras 50, the radars 51, and the sensors 52 to 56.

Then, the arithmetic device 100 calculates the first candidate route and the second candidate route in parallel.

In step S2, the arithmetic device 100 estimates the vehicle external environment using deep learning.

In the subsequent step S3, the arithmetic device 100 sets the first safe area SA1.

In the subsequent step S4, the arithmetic device 100 calculates a first candidate route using reinforcement learning.

In step S5, the arithmetic device 100 recognizes the target object based on a predetermined rule.

In step S6, the arithmetic device 100 sets the second safe area SA2.

In step S7, the arithmetic device 100 calculates a second candidate route based on a predetermined rule.

In the subsequent step S8, the arithmetic device 100 outputs information obtained in steps S4 and S5 to the target motion determination unit 130, and the target motion determination unit 130 determines whether or not the first candidate route is within the second safe area SA2. If YES is selected in this step S8, i.e., there is a route which is entirely included in the second safe area SA2 among the plurality of first candidate routes, the flow proceeds to step S9. On the other hand, if NO is selected, i.e., every first candidate route at least partially deviates from the second safe area SA2, the flow proceeds to step S10.

In step S9, the target motion determination unit 130 selects the first candidate route as a route that the motor vehicle 1 should take.

In step S10, the target motion determination unit 130 selects the second candidate route as a route that the motor vehicle 1 should take.

In the subsequent step S11, the target motion determination unit 130 calculates the target motion of the motor vehicle 1.

In the subsequent step S12, the energy management unit 140 sets the target control amount at the highest energy efficiency to achieve the target motion calculated in step S11.

In the subsequent step S13, the arithmetic device 100 controls the operation of the devices so that the control amount of the devices becomes the target control amount calculated in step S12. After step S13, the flow proceeds to RETURN.

Thus, according to the first embodiment, the arithmetic device 100 includes: the vehicle external environment estimation unit 111 that estimates the vehicle external environment using deep learning based on the output from the information acquisition device that acquires information of the vehicle external environment; the first route calculation unit 113 that calculates the first candidate route based on the estimation result of the vehicle external environment estimation unit 111; the target object recognition unit 121 that recognizes the target object outside the vehicle based on the output from the information acquisition device according to a predetermined rule without using deep learning; the second safe area setting unit 122 that sets the safe area based on the recognition result of the target object recognition unit; and the target motion determination unit 130 that receives the outputs from the first route calculation unit 113 and the second safe area setting unit 122 and determines the target motion of the motor vehicle 1. When the first candidate route is within the second safe area SA2, the target motion determination unit 130 selects the first candidate route as the route that the motor vehicle 1 should take and determines the target motion of the motor vehicle 1 so that the motor vehicle 1 takes the first candidate route. On the other hand, when the candidate route deviates from the safe area, the target motion determination unit 130 does not select the candidate route as the route that the motor vehicle 1 should take.

In this configuration, the arithmetic device 100 having the function of using deep learning can improve the functional safety level.

Second Embodiment

A second embodiment will be described in detail with reference to the drawings. In the following description, components that are common with those described in the first embodiment will be denoted by the same reference numerals, and will not be described in detail.

In the second embodiment, a second arithmetic system 220 of an arithmetic device 200 is configured differently from that of the arithmetic device 100 of the first embodiment. Specifically, unlike the first embodiment, the second arithmetic system 220 of the second embodiment does not include the second route calculation unit.

Even in this configuration, if all the first candidate routes calculated by the first arithmetic system 110 deviate from the second safe area SA2, the target motion determination unit 130 does not select any of the first candidate routes as the route that the motor vehicle 1 should take. In the second embodiment, when the target motion determination unit 130 does not select any of the first candidate routes, the driving mode of the motor vehicle 1 is switched to the manual driving, for example, so that the motor vehicle 1 can travel on a safe route. At the time of switching of the autonomous driving to the manual driving, the driver is desirably notified of the switching of the driving mode by a beeper, for example.

Therefore, the arithmetic device 200 of the second embodiment having the function of using deep learning can also improve the functional safety level.

Figure 9:
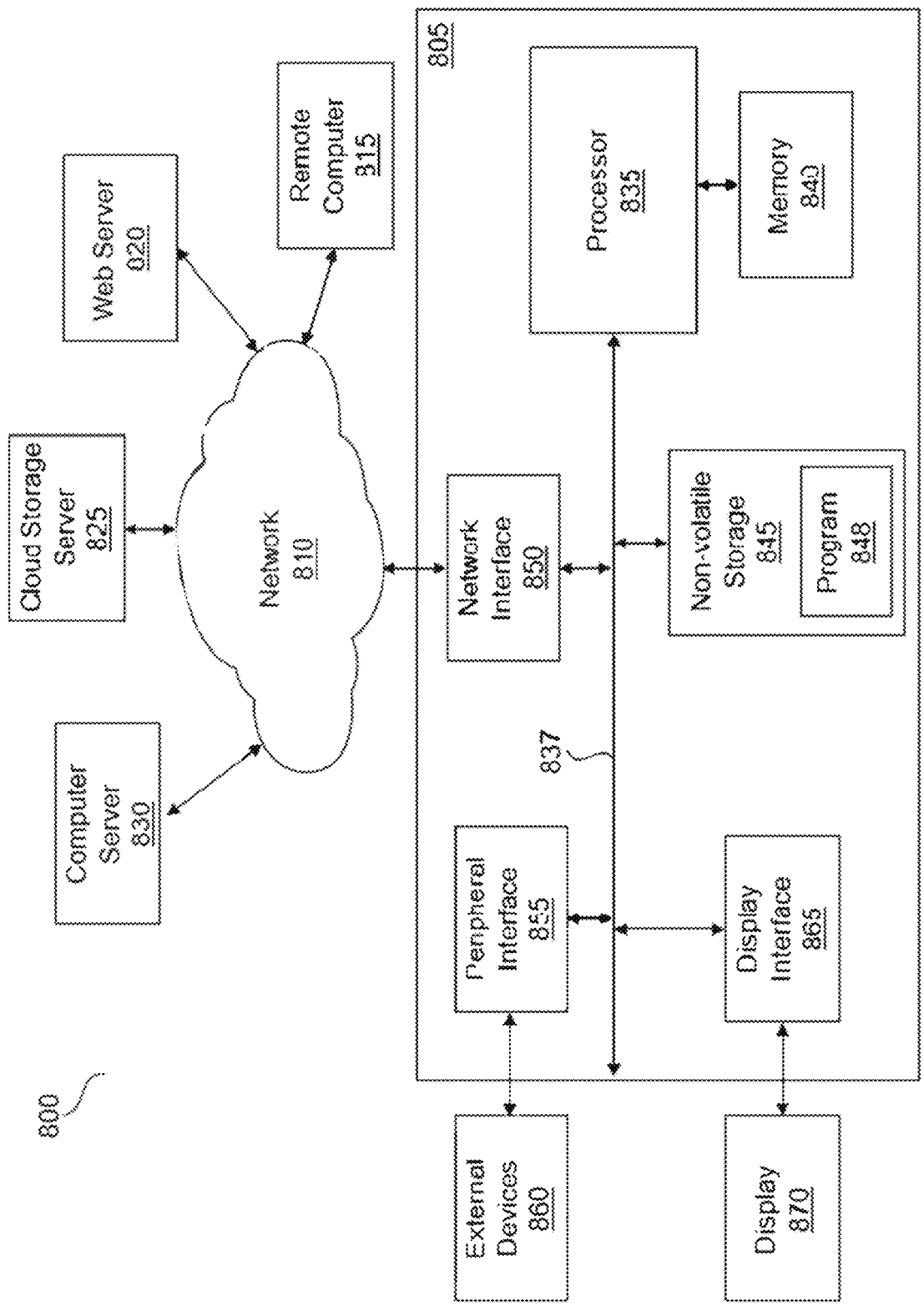
FIG. 9 is a diagram of computer (including circuitry) and a network architecture of an arithmetic device according to the embodiments.

FIG. 9 illustrates a block diagram of a computer that may implement the various embodiments described herein.

The present disclosure may be embodied as a system, a method, and/or a computer program product. The computer program product may include a computer readable storage medium on which computer readable program instructions are recorded that may cause one or more processors to carry out aspects of the embodiment.

The computer readable storage medium may be a tangible device that can store instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C# or similar programming languages. The computer readable program instructions may execute entirely on a user's personal computer, notebook computer, tablet, or smartphone, entirely on a remote computer or computer server, or any combination of these computing devices. The remote computer or computer server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, in order to perform aspects of the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The computer readable program instructions that may implement the systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

FIG. 9 is a functional block diagram illustrating a networked system 800 of one or more networked computers and servers. In an embodiment, the hardware and software environment illustrated in FIG. 9 may provide an exemplary platform for implementation of the software and/or methods according to the present disclosure.

Referring to FIG. 9, a networked system 800 may include, but is not limited to, computer 805, network 810, remote computer 815, web server 820, cloud storage server 825 and computer server 830. In some embodiments, multiple instances of one or more of the functional blocks illustrated in FIG. 9 may be employed.

Additional detail of computer 805 is shown in FIG. 9. The functional blocks illustrated within computer 805 are provided only to establish exemplary functionality and are not intended to be exhaustive. And while details are not provided for remote computer 815, web server 820, cloud storage server 825 and computer server 830, these other computers and devices may include similar functionality to that shown for computer 805.

Computer 805 may be a personal computer (PC), a desktop computer, laptop computer, tablet computer, netbook computer, a personal digital assistant (PDA), a smart phone, or any other programmable electronic device capable of communicating with other devices on network 810.

Computer 805 may include processor 835, bus 837, memory 840, non-volatile storage 845, network interface 850, peripheral interface 855 and display interface 865. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC).

Processor 835 may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm.

Bus 837 may be a proprietary or industry standard high-speed parallel or serial peripheral interconnect bus, such as ISA, PCI, PCI Express (PCI-e), AGP, and the like.

Memory 840 and non-volatile storage 845 may be computer-readable storage media. Memory 840 may include any suitable volatile storage devices such as Dynamic Random Access Memory (DRAM) and Static Random Access Memory (SRAM). Non-volatile storage 845 may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

Program 848 may be a collection of machine readable instructions and/or data that is stored in non-volatile storage 845 and is used to create, manage and control certain software functions that are discussed in detail elsewhere in the present disclosure and illustrated in the drawings. In some embodiments, memory 840 may be considerably faster than non-volatile storage 845. In such embodiments, program 848 may be transferred from non-volatile storage 845 to memory 840 prior to execution by processor 835.

Computer 805 may be capable of communicating and interacting with other computers via network 810 through network interface 850. Network 810 may be, for example, a local area network (LAN), a wide area network (WAN) such as the Internet, or a combination of the two, and may include wired, wireless, or fiber optic connections. In general, network 810 can be any combination of connections and protocols that support communications between two or more computers and related devices.

Peripheral interface 855 may allow for input and output of data with other devices that may be connected locally with computer 805. For example, peripheral interface 855 may provide a connection to external devices 860. External devices 860 may include devices such as a keyboard, a mouse, a keypad, a touch screen, and/or other suitable input devices. External devices 860 may also include portable computer-readable storage media such as, for example, thumb drives, portable optical or magnetic disks, and memory cards. Software and data used to practice embodiments of the present disclosure, for example, program 848, may be stored on such portable computer-readable storage media. In such embodiments, software may be loaded onto non-volatile storage 845 or, alternatively, directly into memory 840 via peripheral interface 855. Peripheral interface 855 may use an industry standard connection, such as RS-232 or Universal Serial Bus (USB), to connect with external devices 860.

Display interface 865 may connect computer 805 to display 870. Display 870 may be used, in some embodiments, to present a command line or graphical user interface to a user of computer 805. Display interface 865 may connect to display 870 using one or more proprietary or industry standard connections, such as VGA, DVI, DisplayPort and HDMI.

As described above, network interface 850, provides for communications with other computing and storage systems or devices external to computer 805. Software programs and data discussed herein may be downloaded from, for example, remote computer 815, web server 820, cloud storage server 825 and computer server 830 to non-volatile storage 845 through network interface 850 and network 810. Furthermore, the systems and methods described in this disclosure may be executed by one or more computers connected to computer 805 through network interface 850 and network 810. For example, in some embodiments the systems and methods described in this disclosure may be executed by remote computer 815, computer server 830, or a combination of the interconnected computers on network 810.

Data, datasets and/or databases employed in embodiments of the systems and methods described in this disclosure may be stored and or downloaded from remote computer 815, web server 820, cloud storage server 825 and computer server 830.

In a non-limiting example, a process is described about how a learned model is trained, according to the present teachings. The example will be in the context of a vehicle external environment estimation circuitry (e.g., a trained model saved in a memory and applied by a computer). However, other aspects of the trained model for object detection/avoidance, route generation, controlling steering, braking, etc., are implemented via similar processes to acquire the learned models used in the components of the computational device 110. Hereinafter, as part of a process for determining how a computing device 1000 calculates a route path (R2, R13, R12, or R11 for example on a road 5, as shown in FIG. 5) in the presence of an obstacle 3 (another vehicle) surrounded by a protection zone (see dashed line that encloses unshaded area) will be explained. In this example, the obstacle 3 is a physical vehicle that has been captured by a forward looking camera from the trailing vehicle 1. The model is hosted in a single information processing unit (or single information processing circuitry).

Figure 10:
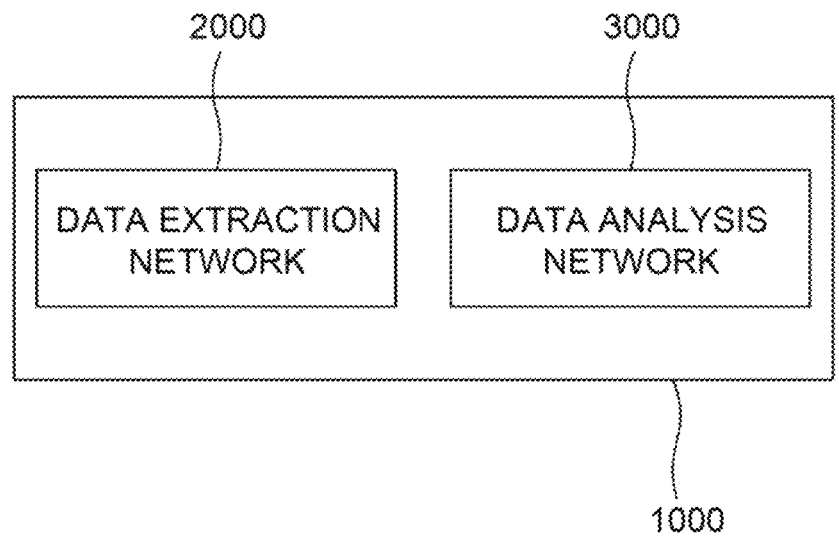
FIG. 10 is a diagram of an AI-based computer architecture according to an embodiment.

First, by referring to FIG. 10, a configuration of the computing device 1000 will be explained. The computing device 1000 may include a data extraction network 2000 and a data analysis network 3000. Further, to be illustrated in FIG. 11, the data extraction network 2000 may include at least one first feature extracting layer 2100, at least one Region-Of-Interest(ROI) pooling layer 2200, at least one first outputting layer 2300 and at least one data vectorizing layer 2400. And, the data analysis network 3000 may include at least one second feature extracting layer 3100 and at least one second outputting layer 3200.

Below, an aspect of calculating a safe route (e.g., R13), around a protection zone that surrounds the obstacle will be explained in the context of training a learned model. Moreover, the specific aspect is to learn a model to detect obstacles (e.g., vehicle 1) on a roadway, and also estimate relative distance to a superimposed protection range that has been electronically superimposed about the vehicle 3 in the image, as well as a zone above a road surface defined by the protection range. To begin with, a first aspect of the learning of a learned model according to the present disclosure will be presented.

First, the computing device 1000 may acquire at least one subject image that includes a superimposed protection zone about the subject vehicle 3. By referring to FIG. 5, the subject image may correspond to a scene of a highway, photographed from a vehicle 1 that is approaching another vehicle 3 from behind on a three lane highway.

After the subject image is acquired, in order to generate a source vector to be inputted to the data analysis network 3000, the computing device 1000 may instruct the data extraction network 2000 to generate the source vector including (i) an apparent distance, which is a distance from a front of vehicle 1 to a back of the protection zone surrounding vehicle 3, and (ii) an apparent size, which is a size of the protection zone.

In order to generate the source vector, the computing device 1000 may instruct at least part of the data extraction network 2000 to detect the obstacle 3 (vehicle) and protection zone.

Specifically, the computing device 1000 may instruct the first feature extracting layer 2100 to apply at least one first convolutional operation to the subject image, to thereby generate at least one subject feature map. Thereafter, the computing device 1000 may instruct the ROI pooling layer 2200 to generate one or more ROI-Pooled feature maps by pooling regions on the subject feature map, corresponding to ROIs on the subject image which have been acquired from a Region Proposal Network (RPN) interworking with the data extraction network 2000. And, the computing device 1000 may instruct the first outputting layer 2300 to generate at least one estimated obstacle location and one estimated protection zone region. That is, the first outputting layer 2300 may perform a classification and a regression on the subject image, by applying at least one first Fully-Connected (FC) operation to the ROI-Pooled feature maps, to generate each of the estimated obstacle location and protection zone region, including information on coordinates of each of bounding boxes. Herein, the bounding boxes may include the obstacle and a region around the obstacle (protection zone), as well as an elevated region above the road surface contained in the bounding boxes.

After such detecting processes are completed, by using the estimated obstacle location and the estimated protection zone location, the computing device 1000 may instruct the data vectorizing layer 2400 to subtract a y-axis coordinate (distance in this case) of an upper bound of the obstacle from a y-axis coordinate of the closer boundary of the protection zone to generate the apparent distance to a portion of the vehicle 1, and multiply a distance of the protection zone and a horizontal width of the protection zone to generate the apparent size of the protection zone.

After the apparent distance and the apparent size are acquired, the computing device 1000 may instruct the data vectorizing layer 2400 to generate at least one source vector including the apparent distance and the apparent size as its at least part of components.

Then, the computing device 1000 may instruct the data analysis network 3000 to calculate an estimated actual protection zone by using the source vector. Herein, the second feature extracting layer 3100 of the data analysis network 3000 may apply second convolutional operation to the source vector to generate at least one source feature map, and the second outputting layer 3200 of the data analysis network 3000 may perform a regression, by applying at least one FC operation to the source feature map, to thereby calculate the estimated protection zone.

As shown above, the computing device 1000 may include two neural networks, i.e., the data extraction network 2000 and the data analysis network 3000. The two neural networks should be trained to perform the processes properly, and thus below it is described how to train the two neural networks by referring to FIG. 11 and FIG. 12.

Figure 11:
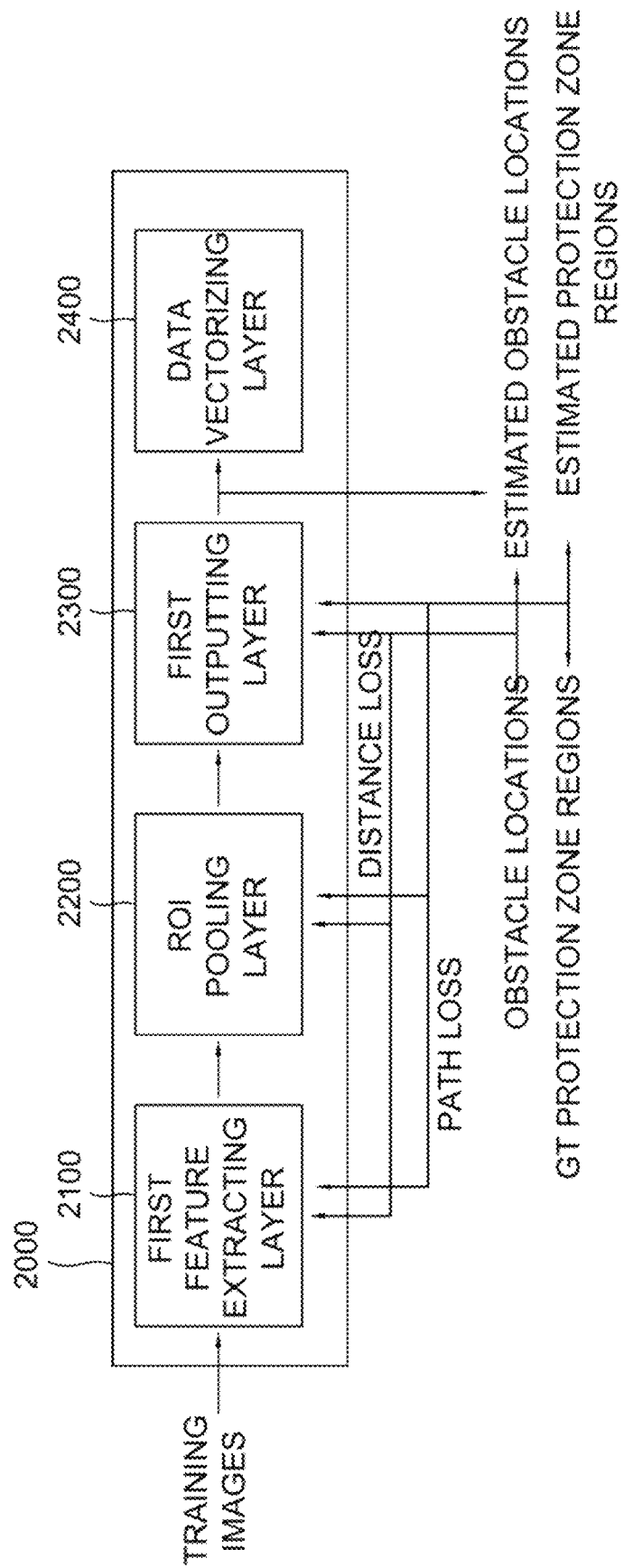
FIG. 11 is a diagram of a data extraction network according to an embodiment.

First, by referring to FIG. 11, the data extraction network 2000 may have been trained by using (i) a plurality of training images corresponding to scenes of subject roadway conditions for training, photographed from fronts of the subject vehicles for training, including images of their corresponding projected protection zones (protection zones superimposed around a forward vehicle, which is an "obstacle" on a roadway) for training and images of their corresponding grounds for training, and (ii) a plurality of their corresponding GT obstacle locations and GT protection zone regions. The protection zones do not occur naturally, but are previously superimposed about the vehicle 3 via another process, perhaps a bounding box by the camera. More specifically, the data extraction network 2000 may have applied aforementioned operations to the training images, and have generated their corresponding estimated obstacle locations and estimated protection zone regions. Then, (i) each of obstacle pairs of each of the estimated obstacle locations and each of their corresponding GT obstacle locations and (ii) each of obstacle pairs of each of the estimated protection zone locations associated with the obstacles and each of the GT protection zone locations may have been referred to, in order to generate at least one vehicle path loss and at least one distance, by using any of loss generating algorithms, e.g., a smooth-L1 loss algorithm and a cross-entropy loss algorithm. Thereafter, by referring to the distance loss and the path loss, backpropagation may have been performed to learn at least part of parameters of the data extraction network 2000. Parameters of the RPN can be trained also, but a usage of the RPN is a well-known prior art, thus further explanation is omitted.

Herein, the data vectorizing layer 2400 may have been implemented by using a rule-based algorithm, not a neural network algorithm. In this case, the data vectorizing layer 2400 may not need to be trained, and may just be able to perform properly by using its settings inputted by a manager.

As an example, the first feature extracting layer 2100, the ROI pooling layer 2200 and the first outputting layer 2300 may be acquired by applying a transfer learning, which is a well-known prior art, to an existing object detection network such as VGG or ResNet, etc.

Figure 12:
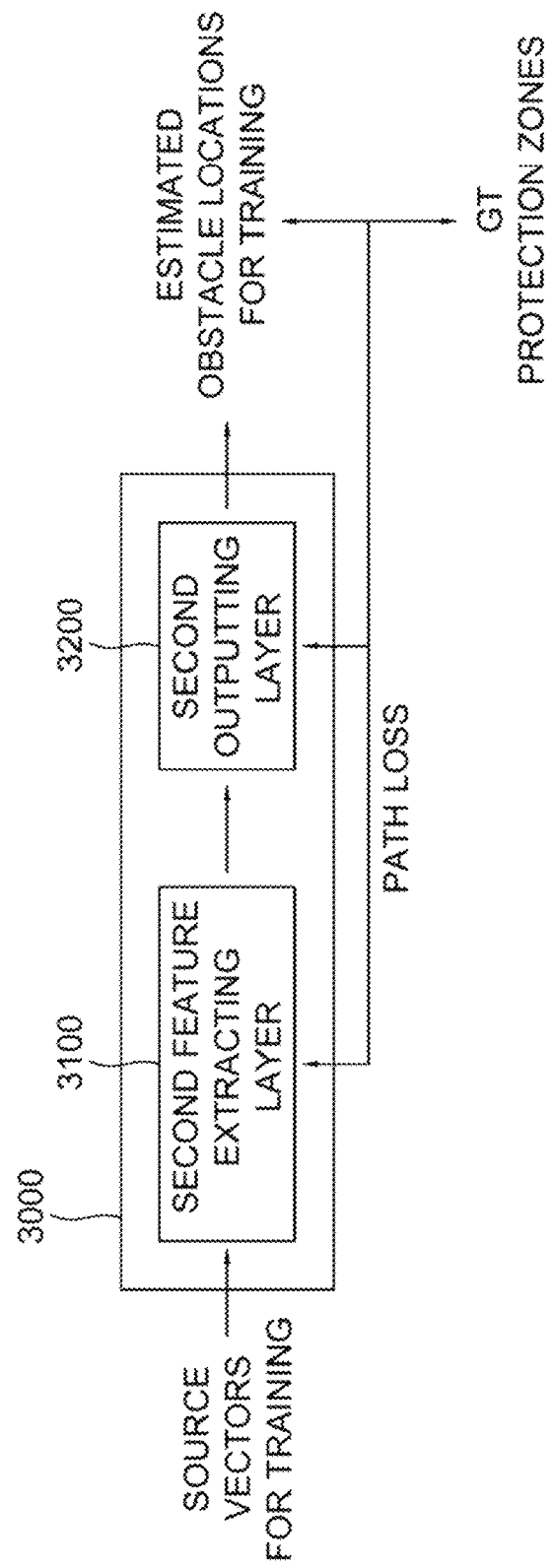
FIG. 12 is a diagram of a data analysis network according to an embodiment.
Figure 13:
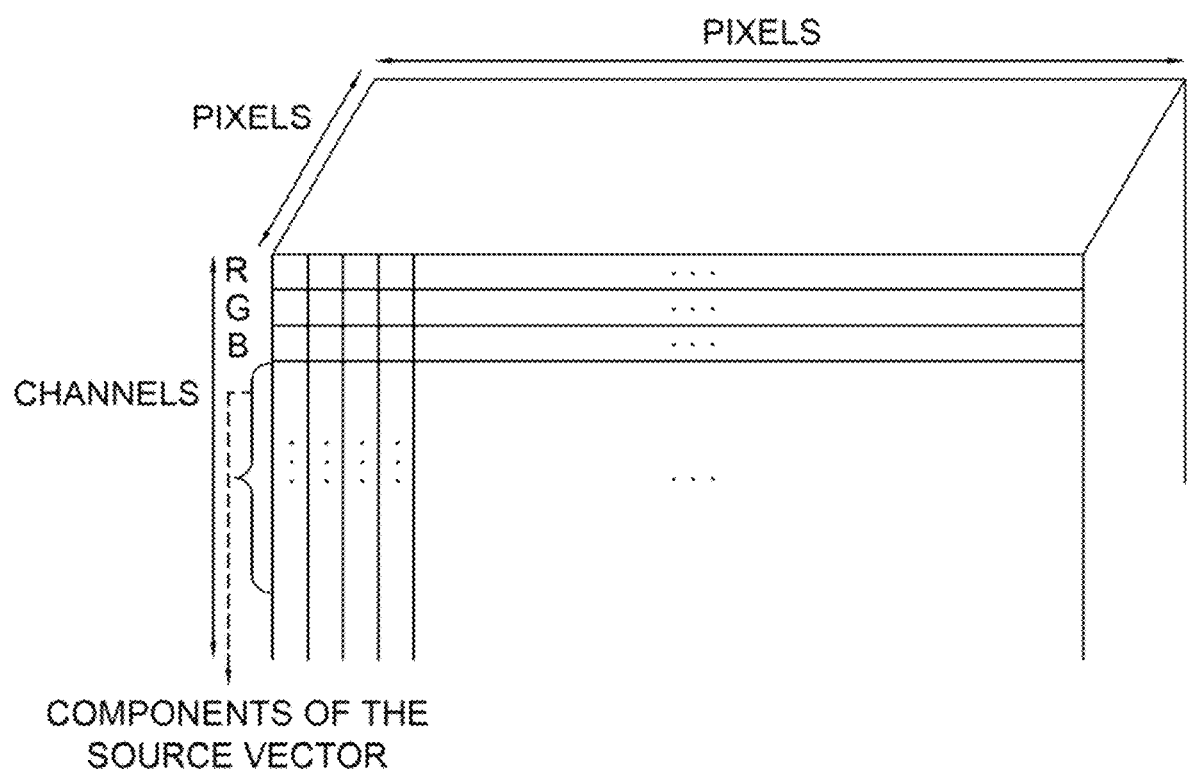
FIG. 13 is a diagram of a concatenated source feature map.

Second, by referring to FIG. 12, the data analysis network 3000 may have been trained by using (i) a plurality of source vectors for training, including apparent distances for training and apparent sizes for training as their components, and (ii) a plurality of their corresponding GT protection zones. More specifically, the data analysis network 3000 may have applied aforementioned operations to the source vectors for training, to thereby calculate their corresponding estimated protection zones for training. Then each of distance pairs of each of the estimated protection zones and each of their corresponding GT protection zones may have been referred to, in order to generate at least one distance loss, by using said any of loss algorithms. Thereafter, by referring to the distance loss, backpropagation can be performed to learn at least part of parameters of the data analysis network 3000.

After performing such training processes, the computing device 1000 can properly calculate the estimated protection zone by using the subject image including the scene photographed from the front of the subject roadway.

Hereafter, another embodiment will be presented. A second embodiment is similar to the first embodiment, but different from the first embodiment in that the source vector thereof further includes a tilt angle, which is an angle between an optical axis of a camera which has been used for photographing the subject image (e.g., the subject obstacle) and a distance to the obstacle. Also, in order to calculate the tilt angle to be included in the source vector, the data extraction network of the second embodiment may be slightly different from that of the first one. In order to use the second embodiment, it should be assumed that information on a principal point and focal lengths of the camera are provided.

Specifically, in the second embodiment, the data extraction network 2000 may have been trained to further detect lines of a road in the subject image, to thereby detect at least one vanishing point of the subject image. Herein, the lines of the road may denote lines representing boundaries of the road located on the obstacle in the subject image, and the vanishing point may denote where extended lines generated by extending the lines of the road, which are parallel in the real world, are gathered. As an example, through processes performed by the first feature extracting layer 2100, the ROI pooling layer 220 and the first outputting layer 2300, the lines of the road may be detected.

After the lines of the road are detected, the data vectorizing layer 240 may find at least one point where the most extended lines are gathered, and determine it as the vanishing point. Thereafter, the data vectorizing layer 2400 may calculate the tilt angle by referring to information on the vanishing point, the principal point and the focal lengths of the camera by using a following formula:

$$\theta_{tilt} = a\tan 2(vy - cy, fy)$$

In the formula, vy may denote a y-axis (distance direction) coordinate of the vanishing point, cy may denote a y-axis coordinate of the principal point, and fy may denote a y-axis focal length. Using such formula to calculate the tilt angle is a well-known prior art, thus more specific explanation is omitted.

After the tilt angle is calculated, the data vectorizing layer 2400 may set the tilt angle as a component of the source vector, and the data analysis network 3000 may use such source vector to calculate the estimated protection zone. In this case, the data analysis network 3000 may have been trained by using the source vectors for training additionally including tilt angles for training.

For a third embodiment which is mostly similar to the first one, some information acquired from a subject obstacle DB storing information on subject obstacles, including the subject obstacle, can be used for generating the source vector. That is, the computing device 1000 may acquire structure information on a structure of the subject vehicle, e.g., 4 doors, vehicle base length of a certain number of feet, from the subject vehicle DB. Or, the computing device 1000 may acquire topography information on a topography of a region around the subject vehicle, e.g., hill, flat, bridge, etc., from location information for the particular roadway. Herein, at least one of the structure information and the topography information can be added to the source vector by the data vectorizing layer 2400, and the data analysis network 3000, which has been trained by using the source vectors for training additionally including corresponding information, i.e., at least one of the structure information and the topography information, may use such source vector to calculate the estimated protection zone.

As a fourth embodiment, the source vector, generated by using any of the first to the third embodiments, can be concatenated channel-wise to the subject image or its corresponding subject segmented feature map, which has been generated by applying an image segmentation operation thereto, to thereby generate a concatenated source feature map, and the data analysis network 3000 may use the concatenated source feature map to calculate the estimated protection zone. An example configuration of the concatenated source feature map may be shown in FIG. 13. In this case, the data analysis network 3000 may have been trained by using a plurality of concatenated source feature maps for training including the source vectors for training, other than using only the source vectors for training. By using the fourth embodiment, much more information can be inputted to processes of calculating the estimated protection zone, thus it can be more accurate. Herein, if the subject image is used directly for generating the concatenated source feature map, it may require too much computing resources, thus the subject segmented feature map may be used for reducing a usage of the computing resources.

Descriptions above are explained under an assumption that the subject image has been photographed from the back of the subject vehicle, however, embodiments stated above may be adjusted to be applied to the subject image photographed from other sides of the subject vehicle. And such adjustment will be easy for a person in the art, referring to the descriptions.

The above described deep learning process for defining protections zones around objects on a roadway, may be used in a similar fashion for developing other learned models, such as for estimating an internal or external environment within the vehicle, calculating a route etc. as discussed herein.

Other Embodiments

The present disclosure is not limited to the embodiments described above, and any change can be made within the scope of the claims as appropriate.

For example, it has been described in the first and second embodiments that the energy management unit 140 sets the target control amount at the highest energy efficiency to achieve the target motion after the target motion determination unit 130 has determined the target motion. However, the present disclosure is not limited thereto, and the energy management unit 140 may be omitted. Specifically, the target motion determination unit 130 may set the target control amount for achieving the target motion.

The foregoing embodiment is merely a preferred example in nature, and the scope of the present disclosure should not be interpreted in a limited manner.
The scope of the present disclosure should be defined by the appended claims, and all the modifications and changes which fall within the scope of equivalents of the appended claims are within the scope of the present disclosure.

INDUSTRIAL APPLICABILITY

The present disclosure is useful as an automotive arithmetic device mounted on a motor vehicle.

DESCRIPTION OF REFERENCE CHARACTERS

1 Motor Vehicle
100 Automotive Arithmetic Device
110 First Arithmetic System
111 Vehicle External Environment Estimation Unit
112 First Safe Area Setting Unit (Dynamic Safe Area Setting Unit)
113 First Route Calculation Unit
120 Second Arithmetic System
121 Target Object Recognition Unit
122 Second Safe Area Setting Unit (Static Safe Area Setting Unit)
130 Target Motion Determination Unit
220 Second Arithmetic System
221 Target Object Recognition Unit
222 Second Safe Area Setting Unit

The invention claimed is:
1. An automotive arithmetic device hosted on a motor vehicle, the automotive arithmetic device comprising:
   circuitry configured to
      estimate a vehicle external environment with a learned model that was trained by deep learning based on an output from an information acquisition device that acquires information of the vehicle external environment;
      calculate a first candidate route based on an estimation result previously obtained;
      recognize a target object outside the motor vehicle based on the output from the information acquisition device according to a predetermined rule set without using deep learning;
      set a static safe area which is an area where the target object is avoidable based on a recognition result that was previously provided by the circuitry; and
      determine a target motion of the motor vehicle by application of the first candidate route and the static safe area, wherein
   the circuitry
      sets the first candidate route as a route that the motor vehicle should take and determines the target motion of the motor vehicle so that the motor vehicle takes the first candidate route under a condition the first candidate route is entirely within the static safe area, and does not select the first candidate route as the route that the motor vehicle should take under a condition the first candidate route at least partially lies outside the static safe area,
      calculates a second candidate route that passes the static safe area only, and
      selects the second candidate route as the route that the motor vehicle should take and determines the target motion of the motor vehicle so the motor vehicle takes the second candidate route under a condition the first candidate route at least partially deviates from the static safe area.

2. The automotive arithmetic device of claim 1, wherein the circuitry is further configured to
set a dynamic safe area which is an area that the motor vehicle is able to pass based on the estimation result, wherein
the first candidate route is a route that passes the dynamic safe area.

3. The automotive arithmetic device of claim 1, wherein
the first candidate route includes a plurality of first candidate routes, and
under a condition at least one of the plurality of first candidate routes passes the static safe area only, the circuitry selects the first candidate route that passes the static safe area only as the route that the motor vehicle should take, and the circuitry selects the second candidate route as the route that the motor vehicle should take when all the plurality of first candidate routes partially deviate from the static safe area.

4. The automotive arithmetic device of claim 2, wherein
the first candidate route includes a plurality of first candidate routes, and
under a condition at least one of the plurality of first candidate routes passes the static safe area only, the circuitry selects the first candidate route that passes the static safe area only as the route that the motor vehicle should take, and the circuitry selects the second candidate route as the route that the motor vehicle should take when all the plurality of first candidate routes partially deviate from the static safe area.

5. The automotive arithmetic device of claim 1, wherein
the circuitry is configured to set a destination that is forward of the motor vehicle, and respectively calculate the first candidate route to the destination and the second candidate route to the destination, and
under a condition the motor vehicle has arrived at the destination, the circuitry sets a new destination that is different than the destination, and calculates another first candidate route and another second candidate route to the new destination.

6. The automotive arithmetic device of claim 2, wherein
the circuitry is configured to set a destination that is forward of the motor vehicle, and respectively calculate the first candidate route to the destination and the second candidate route to the destination, and
under a condition the motor vehicle has arrived at the destination, the circuitry sets a new destination that is different than the destination, and calculates another first candidate route and another second candidate route to the new destination.

7. The automotive arithmetic device of claim 3, wherein
the circuitry is configured to set a destination that is forward of the motor vehicle, and respectively calculate the first candidate route to the destination and the second candidate route to the destination, and
under a condition the motor vehicle has arrived at the destination, the circuitry sets a new destination that is different than the destination, and calculates another first candidate route and another second candidate route to the new destination.

8. The automotive arithmetic device of claim 4, wherein
the circuitry is configured to set a destination that is forward of the motor vehicle, and respectively calculate the first candidate route to the destination and the second candidate route to the destination, and
under a condition the motor vehicle has arrived at the destination, the circuitry sets a new destination that is different than the destination, and calculates another first candidate route and another second candidate route to the new destination.

9. The automotive arithmetic device of claim 1, further comprising:
a first arithmetic system including the circuitry; and
a second arithmetic system that is independent of the first arithmetic system.

10. The automotive arithmetic device of claim 2, further comprising:
a first arithmetic system including the circuitry; and
a second arithmetic system that is independent of the first arithmetic system.

11. The automotive arithmetic device of claim 3, further comprising:
a first arithmetic system including the circuitry; and
a second arithmetic system that is independent of the first arithmetic system.

12. The automotive arithmetic device of claim 4, further comprising:
a first arithmetic system including the circuitry; and
a second arithmetic system that is independent of the first arithmetic system.

13. The automotive arithmetic device of claim 5, further comprising:
a first arithmetic system including the circuitry; and
a second arithmetic system that is independent of the first arithmetic system.

14. The automotive arithmetic device of claim 6, further comprising:
a first arithmetic system including the circuitry; and
a second arithmetic system that is independent of the first arithmetic system.

15. The automotive arithmetic device of claim 7, further comprising:
a first arithmetic system including the circuitry; and
a second arithmetic system that is independent of the first arithmetic system.

16. The automotive arithmetic device of claim 8, further comprising:
a first arithmetic system including the circuitry; and
a second arithmetic system that is independent of the first arithmetic system.

17. The automotive arithmetic device of claim 9, wherein
the circuitry of the first arithmetic system is configured to set a dynamic safe area which is an area that the motor vehicle is able to pass based on the estimation result, and
the second arithmetic system includes other circuitry that is configured to set the static safe area.

18. A method for setting a candidate route for a motor vehicle comprising:
estimating, with circuitry, a vehicle external environment with a learned model that was trained by deep learning based on an output from an information acquisition device that acquires information of the vehicle external environment;
calculating a first candidate route based on an estimation result previously obtained;
recognizing a target object outside the motor vehicle based on the output from the information acquisition device according to a predetermined rule set without using deep learning;
setting a static safe area which is an area where the target object is avoidable based on a recognition result that was previously provided by the circuitry; and determining a target motion of the motor vehicle by application of the first candidate route and the static safe area, wherein the calculating includes setting the first candidate route as a route that the motor vehicle should take and determining the target motion of the motor vehicle so that the motor vehicle takes the first candidate route under a condition the first candidate route is entirely within the static safe area, and not selecting the first candidate route as the route that the motor vehicle should take under a condition the first candidate route at least partially lies outside the static safe area, calculating a second candidate route that passes the static safe area only, and selecting the second candidate route as the route that the motor vehicle should take and determining the target motion of the motor vehicle so the motor vehicle takes the second candidate route under a condition the first candidate route at least partially deviates from the static safe area.

\* \* \* \* \*